(12) United States Patent
Mitsumoto et al.

(10) Patent No.: US 7,370,338 B2
(45) Date of Patent: May 6, 2008

(54) DISC TYPE RECORDING/REPRODUCTION DEVICE

(75) Inventors: Yoichiro Mitsumoto, Tokyo (JP); Ryuji Kusumi, Tokyo (JP); Hideaki Tsutsumi, Tokyo (JP); Yusuke Hirano, Tokyo (JP)

(73) Assignee: Sony Corporation, Tokyo (JP)

( * ) Notice: Subject to any disclaimer, the term of this patent is extended or adjusted under 35 U.S.C. 154(b) by 403 days.

(21) Appl. No.: 10/432,438

(22) PCT Filed: Sep. 18, 2002

(86) PCT No.: PCT/JP02/09580

§ 371 (c)(1),
(2), (4) Date: Nov. 5, 2003

(87) PCT Pub. No.: WO03/030163

PCT Pub. Date: Apr. 10, 2003

(65) Prior Publication Data

US 2004/0066712 A1    Apr. 8, 2004

(30) Foreign Application Priority Data

Sep. 26, 2001  (JP) ............................ 2001-292919

(51) Int. Cl.
*G11B 17/03* (2006.01)
(52) U.S. Cl. ..................................... 720/601
(58) Field of Classification Search ............... 720/601, 720/607, 602, 613; 369/30.27
See application file for complete search history.

(56) References Cited

U.S. PATENT DOCUMENTS 6,789,260 B2 * 9/2004 Shiomi ....................... 720/607
6,947,355 B2 * 9/2005 Hong et al. ............... 369/30.27
7,069,564 B2 * 6/2006 Naoki ......................... 720/601
7,093,268 B2 * 8/2006 Kamei et al. .............. 720/601

FOREIGN PATENT DOCUMENTS

| JP | 8-7427 | 1/1996 |
| JP | 08007427 A | * 1/1996 |
| JP | 9-106602 | 4/1997 |
| JP | 10-40624 | 2/1998 |
| JP | 2000-339946 | 12/2000 |
| JP | 2000339946 A | * 12/2000 |

* cited by examiner

*Primary Examiner*—Tianjie Chen
(74) *Attorney, Agent, or Firm*—Oblon, Spivak, McClelland, Maier & Neustadt, P.C.

(57) ABSTRACT

A disk recording-reproducing apparatus ensures a large transport distance of a tray which moves a disk-shaped recording medium between an ejecting position and a recording-reproducing position while decreasing a dimension in the transport direction. A drive section (47) is built into a tray (13) which can be extracted from and retracted into an external chassis (10) and moves a disk-shaped recording medium between the ejecting position and the recording-reproducing position. A pinion (56) comprises an output end of the drive section (47) and rolls on a rack (24) of a chucking slider (20) to self-propel the tray (13). After the tray (13) completely moves to the recording-reproducing apparatus side, an output from the drive section (47) of the tray (13) is used to move the chucking slider (20) to the ejecting direction of the tray (13). Then, a cam groove (23) provided on the chucking slider (20) is used to raise a base unit (30).

3 Claims, 42 Drawing Sheets

Recording-reproducing position

Ejecting position

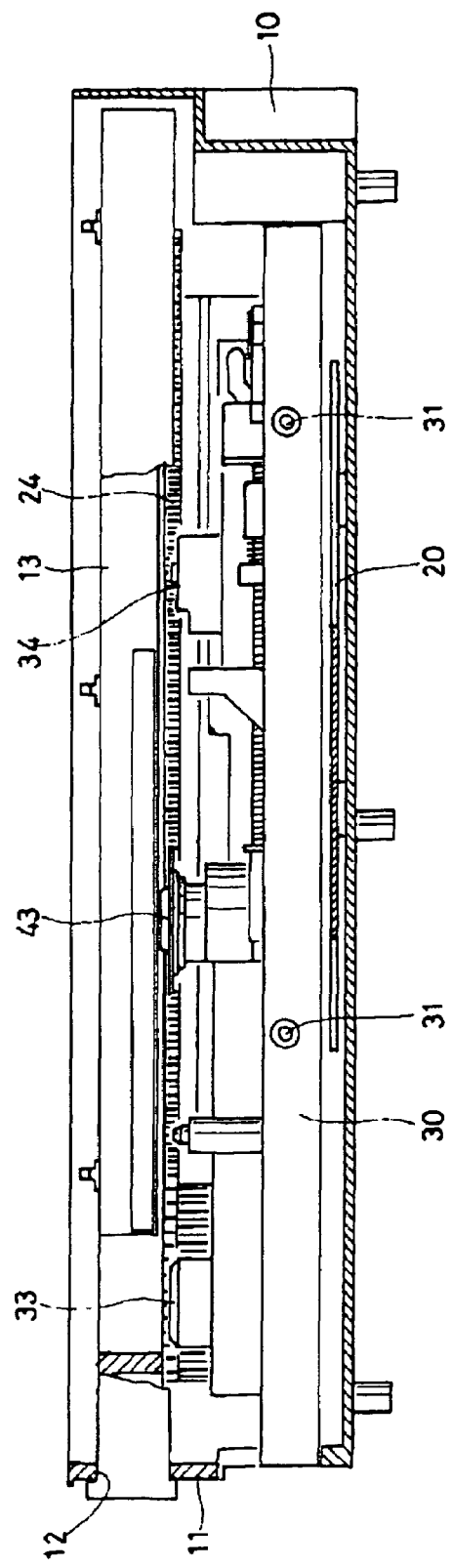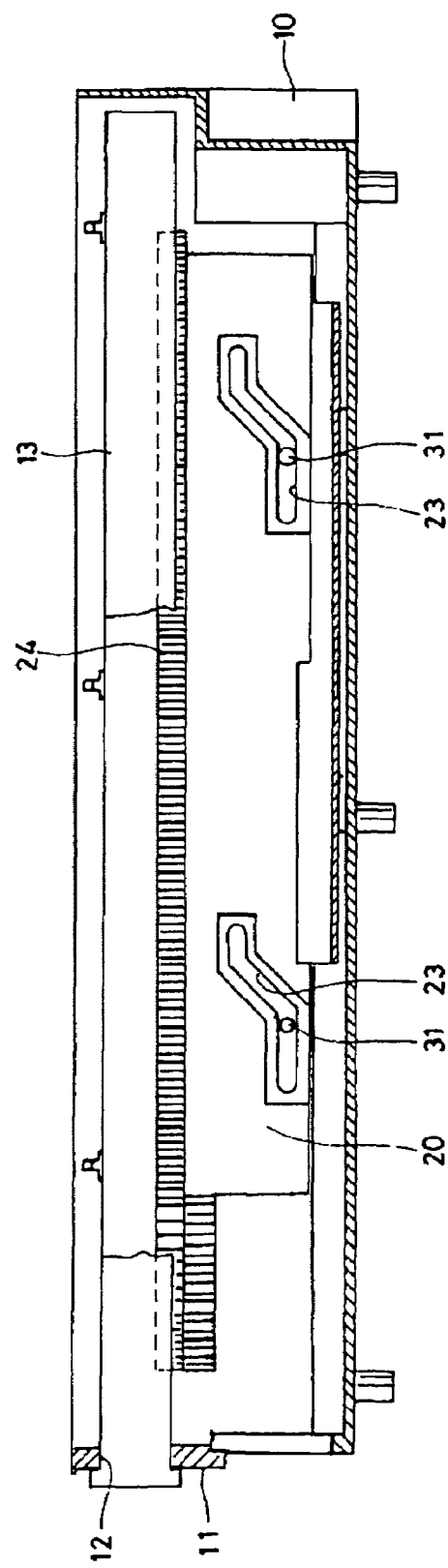
Fig.25A
Fig.25B

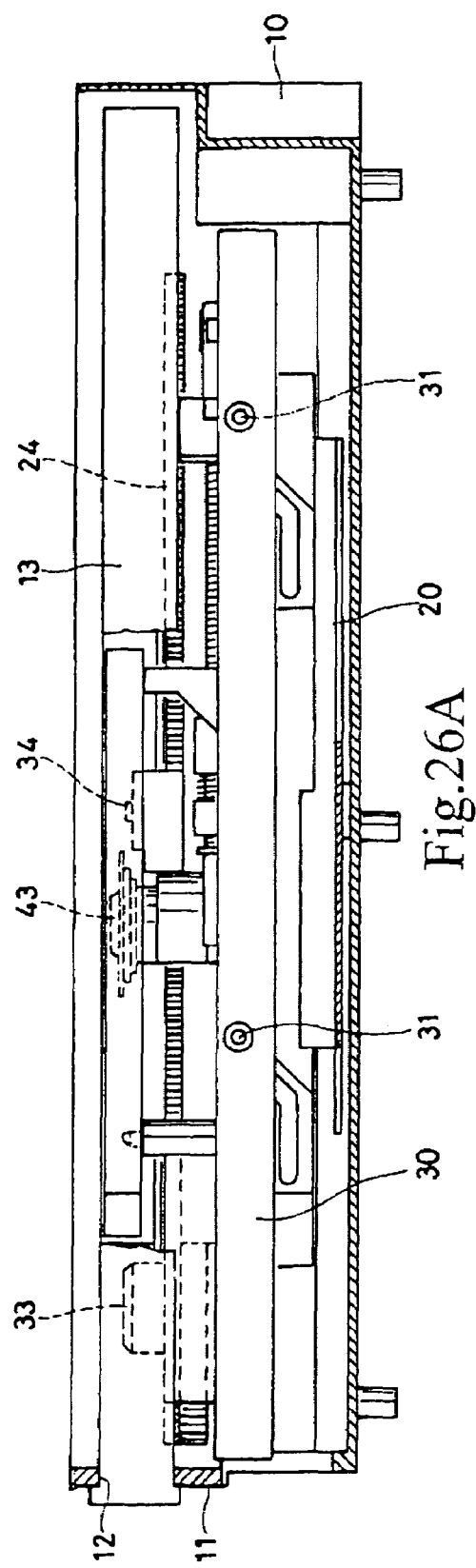
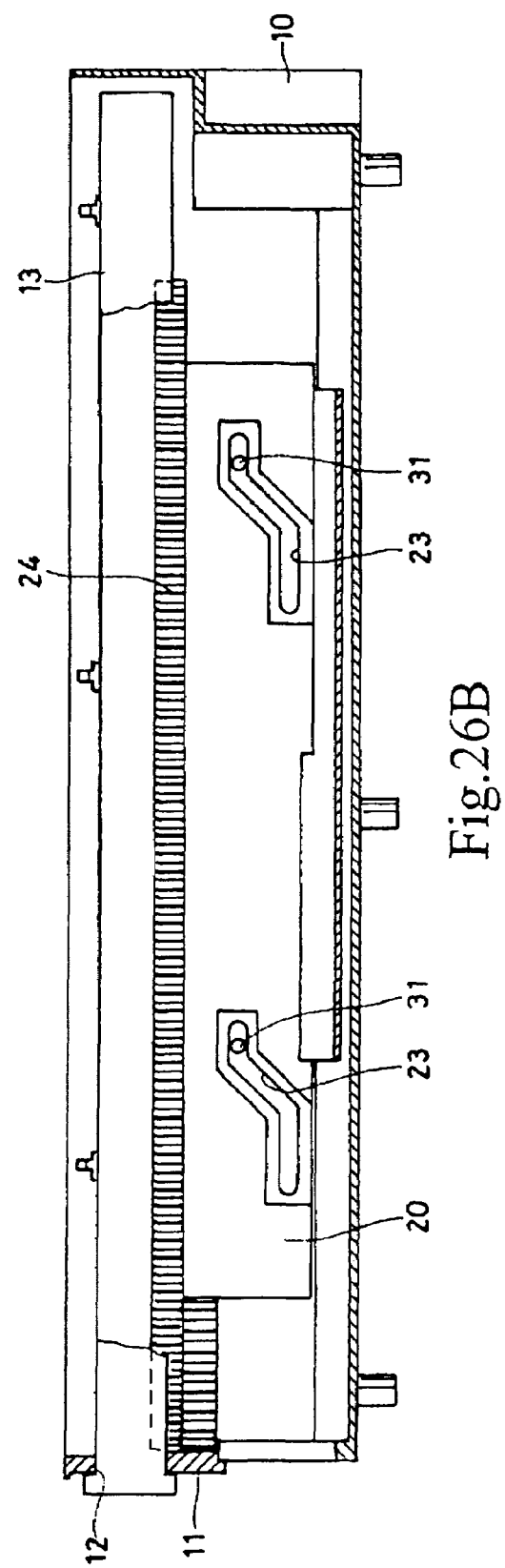
Fig.26A
Fig.26B

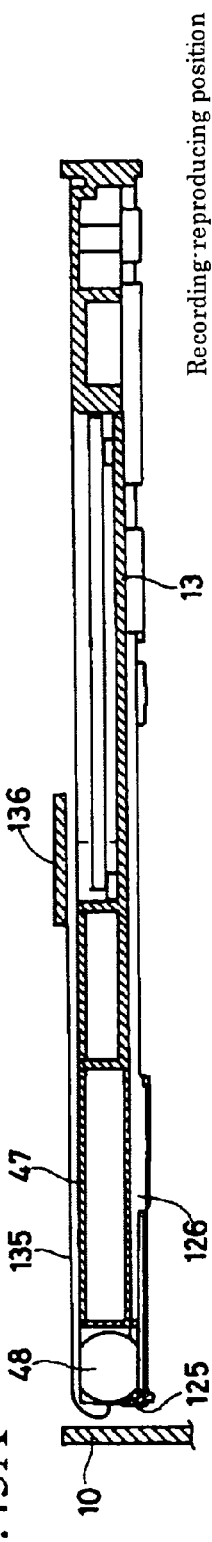
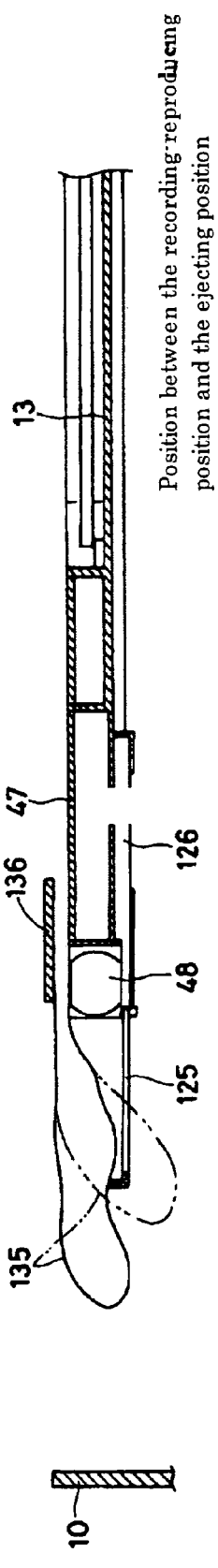
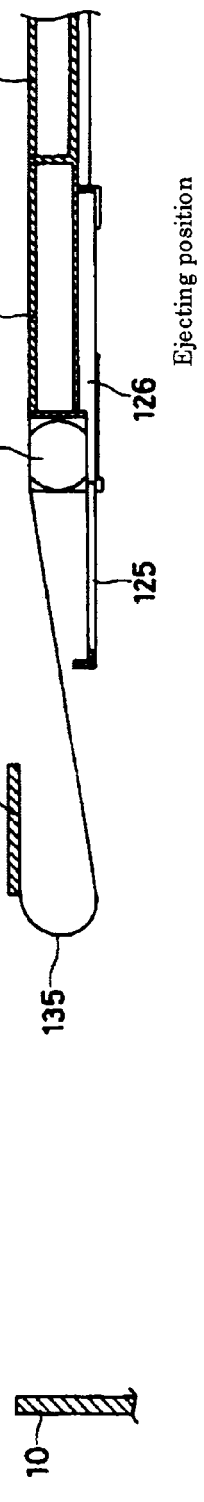
Fig.45A — Recording·reproducing position
Fig.45B — Position between the recording·reproducing position and the ejecting position
Fig.45C — Ejecting position

DISC TYPE RECORDING/REPRODUCTION DEVICE

TECHNICAL FIELD

The present invention relates to a disk recording-reproducing apparatus and more particularly to a disk recording-reproducing apparatus that uses a pickup to perform recording and/or reproducing by rotating a disk-shaped recording medium.

BACKGROUND ART

There is widely used a disk recording-reproducing apparatus that uses disk-shaped recording media such as a CD (compact disk), a DVD and an optical disk for recording and/or reproducing music and videos. Further, such disk-shaped recording media are used as storage devices for information processing apparatuses such as computers.

In this case, the disk-shaped recording medium is mounted on a tray. Then, the tray moves from an ejecting position to a recording-reproducing position. With this state, a turntable rises from the bottom and floats the disk-shaped recording medium to rotatively drive it. Then, an optical pickup moves in the radial direction of the disk-shaped recording medium for recording or reproduction.

The disk recording-reproducing apparatus requires the tray for moving the recording medium comprising an optical disk between the ejecting position and the recording-reproducing position. A drive means is used to move the tray between these two positions.

If a drive section for moving the tray is positioned to the rear of the chassis where the tray is pushed into the chassis farthest from the front, moving the tray to the ejecting position disengages the drive section from the tray. Accordingly, the tray drive section needs to be provided to the front of the chassis and on the ejecting position side.

On the other hand, the disk recording-reproducing apparatus necessitates arranging the optical pickup below the tray. If the optical pickup is arranged to the front of the turntable and on the ejecting position side, the drive section and the optical pickup must be arranged to the front of the chassis. The apparatus may be configured to provide two or more types of optical pickups and inevitably arrange the optical pickups to the front of the turntable. As a disadvantageous effect, the entire apparatus will have a large depth due to the drive section and the optical pickup on the front of the turntable.

As mentioned above, after the tray mounted with the disk-shaped recording medium is moved from the ejecting position to the reproduction position, the turntable and the optical pickup need to be raised so as to approach the disk-shaped recording medium. Conventionally, the turntable and the optical pickup are provided as the same base unit. A vertical drive means is used for vertically operating the turntable and the optical pickup. Accordingly, this configuration requires drive sections each for driving the dray and for vertically operating the base unit, increasing the number of drive sections.

The present invention has been made in consideration of the foregoing. It is therefore an object of the present invention to provide a disk recording-reproducing apparatus which prevents a depth from increasing due to provision of a drive section for driving a tray and prevents the number of drive sections from increasing due to provision of a drive section for vertically operating a base unit.

DISCLOSURE OF THE INVENTION

The present invention relates to a disk recording-reproducing apparatus that rotates a disk-shaped recording medium and uses a pickup to record and/or reproduce data from the recording medium, the apparatus comprising:
a tray to move said disk-shaped recording medium between a recording-reproducing position and an ejecting position; and
a drive section which is provided on said tray to self-propel said tray between said recording-reproducing position and said ejecting position.

An output end of the drive section may comprise a pinion which, in a chassis, rotates by engaging with a rack arranged along a transport direction of the tray for self-propelling. A motor of the drive section may be supplied with power from a fixed side via a flexible printed circuit board subject to U-shaped bending. Further, the tray may be provided with a retractable guide mechanism that supports the flexible printed circuit board from underneath.

Further, the present invention relates to a disk recording-reproducing apparatus which rotates a disk-shaped recording medium and uses a pickup for recording and/or reproducing operations, said apparatus comprising:
a base unit having the pickup and a turntable to rotate the disk-shaped recording medium;
a chucking slider to move the base unit up and down;
a tray to move the disk-shaped recording medium between a recording-reproducing position and an ejecting position on the base unit; and
a drive section which is provided on the tray to self-propel the tray between the recording-reproducing position and the ejecting position,
wherein the drive section moves the tray to the recording-reproducing position to stop movement and then moves the chucking slider to raise the base unit.

A lock means may lock the chucking slider while the tray is moving, and may lock the tray and may unlock the chucking slider when the tray moves to the recording-reproducing position. The lock means may comprise a lever. A hook thereof may engage with a recessed section of the chucking slider to lock the chucking slider. A lock pin of the lock lever may enter an L-shaped groove of the tray to lock the tray. The hook of the lock lever may touch a cam surface of the chucking slider so that the lock lever may lock and hold the tray.

A drive section on the tray may comprise a motor and a gear train. The gear train may be capable of changing gear ratios. A gear ratio may be changeable in accordance with movements of the tray and the chucking slider. The drive section may have a changeover member. Moving the tray to a recording-reproducing position may allow the changeover member to touch a fixed side. Then a changeover operation may be performed to change a gear ratio.

There may be provided an emergency ejection member which can be manually operated from the outside. Operating the ejection member may allow the chucking slider to lower the base unit. The tray may be pushed to an ejecting position side at the last stroke in movement of the chucking slider according to the emergency ejection member. The emergency ejection member may be attached to an eternal chassis via a dust-proof structure having a spring and may be driven to move in an axis line direction against the spring.

Furthermore, the present invention relates to a disk recording-reproducing apparatus which rotates a disk-shaped recording medium and uses a pickup for recording and/or reproducing operations, said apparatus comprising:

a tray to move the disk-shaped recording medium between a recording-reproducing position and an ejecting position; and a transport means for moving the tray between the recording-reproducing position and the ejecting position; and a detection means for detecting a type of a disk-shaped recording medium placed on the tray, wherein a detection result of the detection means changes an output or speed of the transport means.

The detection means may detect a distinction between cartridge type and bare disk type disk-shaped recording media.

According to a preferred aspect of the present invention, the drive section is mounted on the rear end of the disk tray. The rack gear provided in the external chassis engages with the pinion constituting an output end of the above-mentioned drive section to move the tray in a self-propelled manner. The DVD optical pickup and the DVR optical pickup are provided before and after the turntable. In order to reduce the apparatus depth, the drive section is mounted on the tray to eliminate a space for installing the tray drive section.

The rack gear on the external chassis is attached to the chucking slider that is slidably mounted on the bottom of the chassis. When the tray moves, the lock lever prevents the chucking slider from sliding. The lock lever locks the tray when the tray moves to the recording-reproducing position to complete loading of a disk-shaped recording medium. Concurrently, the chucking slider having the rack gear is unlocked to allow the tray drive section equipped with a motor to reversely slide the chucking slider. This makes it possible to move up and down the base unit mounted with the optical pickups and the turntable. That is to say, the tray-mounted single drive section not only drives the tray, but also moves the base unit up and down.

An L-shaped groove is provided on the bottom surface of the tray at its rear end. The lock lever's lock pin is introduced into the innermost part of the L-shaped groove. After the chucking slider is unlocked, the lock lever's hook is restricted by the cam surface on the moved chucking slider. This makes the tray to be locked by the lock lever's lock pin introduced into the innermost part of the L-shaped groove.

While the disk recording-reproducing apparatus is provided with two optical pickups before and after the disk rotation section, the integrated tray drive section is mounted on the tray at its rear. This structure minimizes the disk recording-reproducing apparatus. Since the lock lever is used to change restrictions on the chucking slider and the tray, the tray drive section having the single motor can drive the tray and move the base unit up and down. It is possible to provide the simplified structure, decrease the number of parts, and save costs.

Another aspect of the present invention relates to the emergency ejection mechanism that allows a disk-shaped recording medium to be ejected when the motor for the tray drive section does not rotate in the disk recording-reproducing apparatus using disk-shaped recording media. An aperture is formed in the bottom of the external chassis. An emergency ejecting pinion is provided inside the aperture. The tray can be pulled out manually by inserting a screwdriver. A spring is used to seat the emergency ejecting pinion on the bottom of the chassis. When a screwdriver is inserted, the pinion can move in the axis line direction to rotate. In a normal state, the bottom end of the pinion is seated to prevent dust from entering.

According to this aspect, a recording medium can be ejected by manually operating the emergency ejecting pinion even if the motor of the tray drive section does not rotate or the drive section fails. Furthermore, the spring applies a force to the emergency ejecting pinion. Accordingly, the emergency ejecting pinion, before pressed, is seated on the mounting section of the external chassis. An opening for inserting the screwdriver is closed to provide a dust-proof effect.

According to still another aspect of the present invention, there is provided the drive section for driving a tray that moves a disk-shaped recording medium between the ejecting position and the recording-reproducing position. The drive section is mounted on the tray itself. A flexible printed circuit board is used to supply power to the drive section motor. The flexible printed circuit board bends in a U-shaped manner. Since the tray is long and necessitates a long transport distance, the flexible printed circuit board bending in a U-shaped manner becomes long accordingly. This causes a possibility of contact between the slacked flexible printed circuit board and other parts. To avoid this, there is provided a guide for the flexible printed circuit board. The guide is structured to be retractable in accordance with the tray movement.

The flexible printed circuit board guide is slidably attached to the guide rail. When the tray is pulled out, the flexible printed circuit board guide extends to support the flexible printed circuit board from underneath. When the tray is pushed toward the recording-reproducing position, the flexible printed circuit board guide is put under the bottom surface of the tray. That is to say, the flexible printed circuit board guide is attached under the tray and extends and retracts in accordance with the tray movement. A bearer of the guide rail supports the flexible printed circuit board guide. At this time, the flexible printed circuit board guide is automatically assembled when its nail crosses over the guide rail's cross bar. This improves assemblability of the flexible printed circuit board guide.

This configuration makes it possible to effectively support the flexible printed circuit board in a limited space by providing the flexible printed circuit board guide under the tray. Since the helical extension spring is used to slide the flexible printed circuit board guide, the guide can be structured to extend when supporting the flexible printed circuit board and can be compactly retracted otherwise. The flexible printed circuit board guide is inserted into the guide rail from one end thereof. The flexible printed circuit board guide is prevented from being disengaged when its nail crosses over the cross bar. This structure can facilitate the insertion and assembly and improve the assembly efficiency.

BRIEF DESCRIPTION OF DRAWINGS

FIGS. 25A and 25B are partially vertical sectional views of the apparatus when the tray has completely retracted;

FIGS. 26A and 26B are partially vertical sectional views of the apparatus when the base unit is raised;

FIGS. 45A through 45C are partially enlarged side views of the printed circuit board guide mechanism with the tray ejected and retracted.

BEST MODE FOR CARRYING OUT THE INVENTION (1) Description of the Configuration Overall Configuration FIGS. 1 and 2 show an overall configuration of the disk recording-reproducing apparatus according to an embodiment of the present invention. The disk recording-reproducing apparatus has an external chassis 10 forming a flat, rectangular solid. A front panel 11 closes a front aperture of the external chassis 10. A horizontal aperture 12 is formed in the front panel 11. As shown in FIGS. 1 and 2, the horizontal aperture 12 allows a tray 13 to be freely inserted and ejected. A step section 18 is provided on each of both inner sides of the external chassis 10 The both step sections 18 support the tray 13 so that it can slide.

Figure 1:
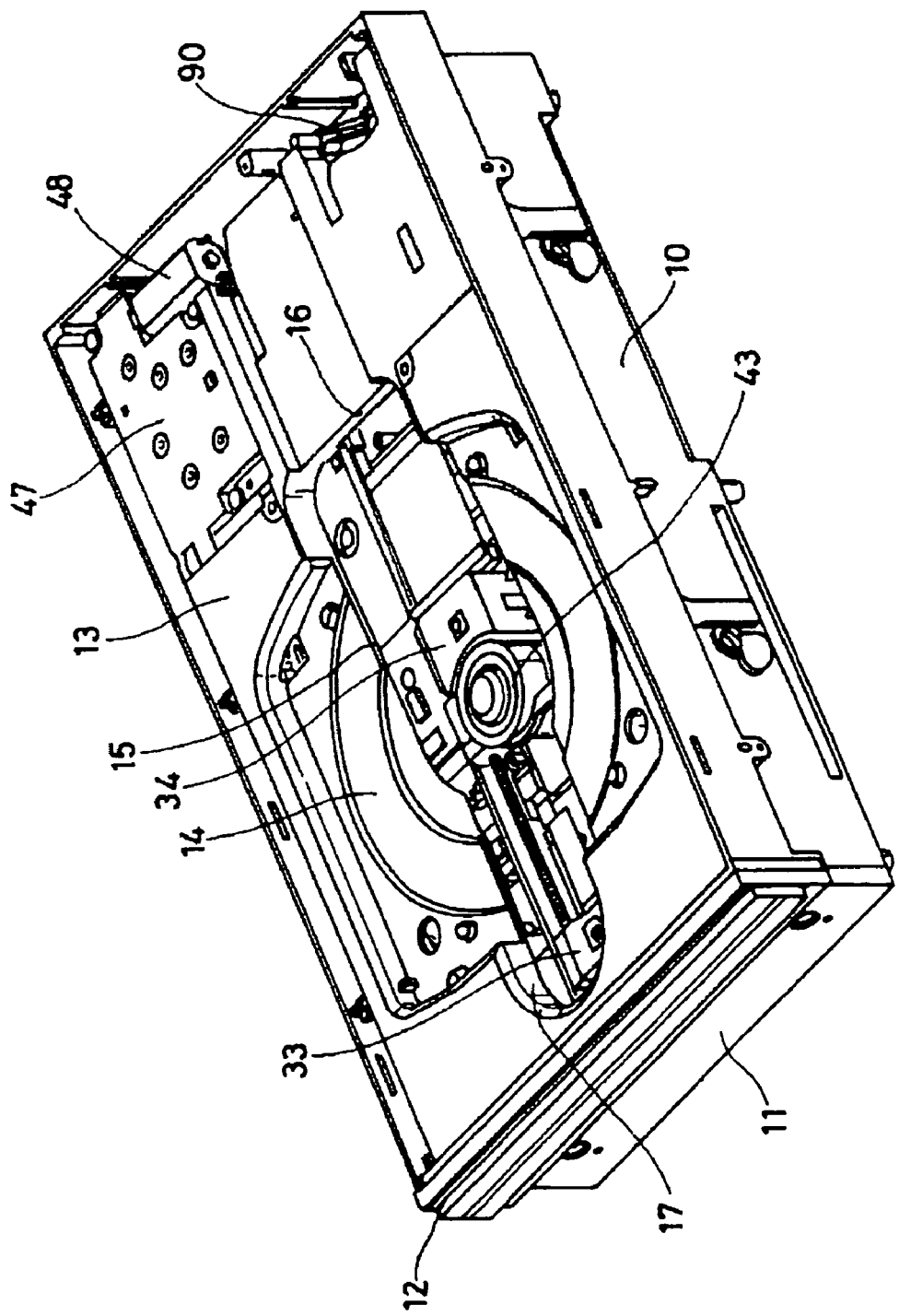
FIG. 1 is a perspective view showing an overall configuration of a disk recording-reproducing apparatus.

A recessed section 14 is formed approximately at the center of the tray 13. The recessed section 14 holds and supports a disk-shaped recording medium. An aperture 15 is formed across the recessed section 14 in a tray movement direction. The opening 15 has a U-shaped cut 16 farthest from the front and a semicircular cut 17 nearest to the front. The optical pickups can enter these cuts 16 and 17.

Figure 3:
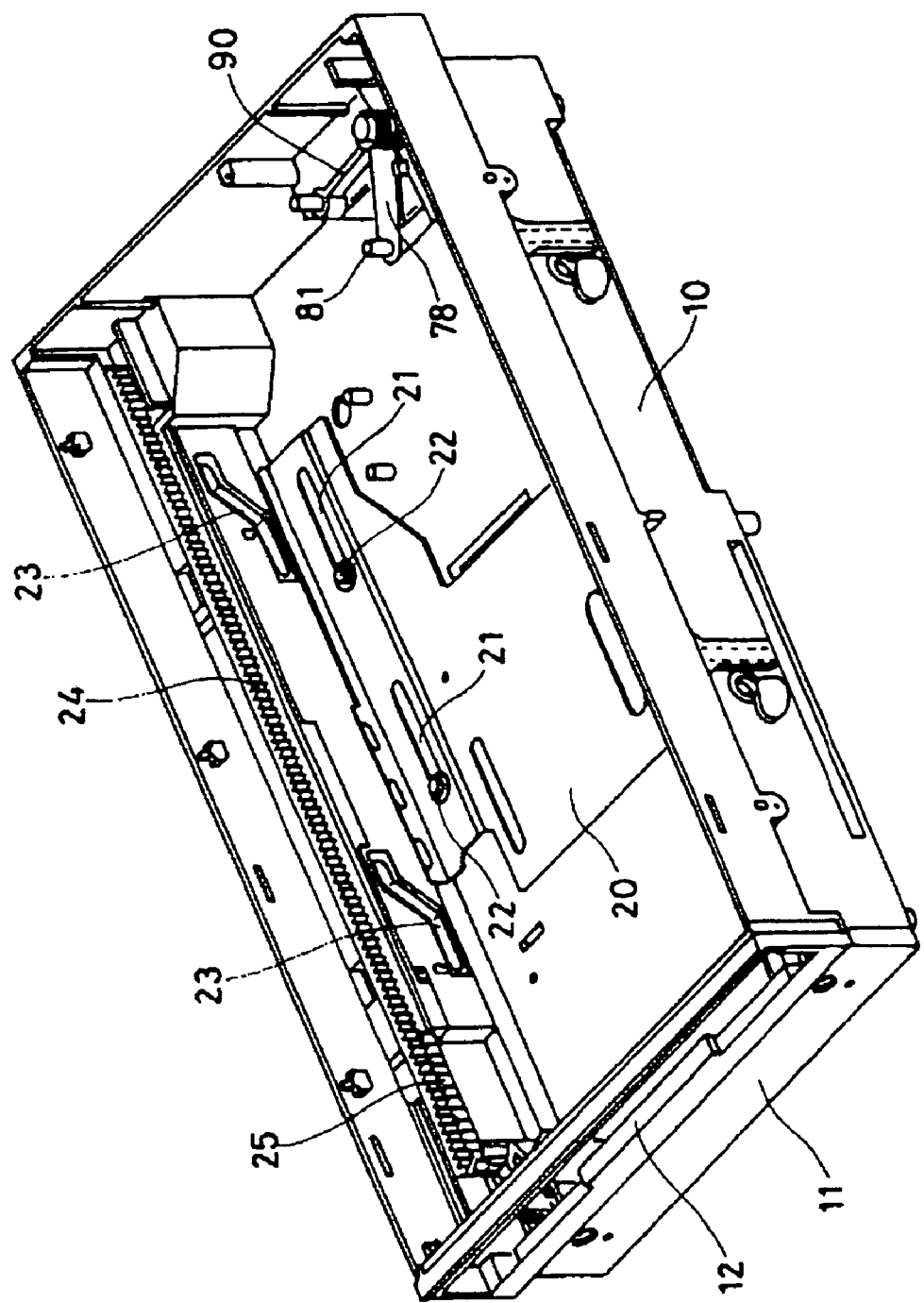
FIG. 3 is a perspective view of an external chassis with its upper part opened.
Figure 4:
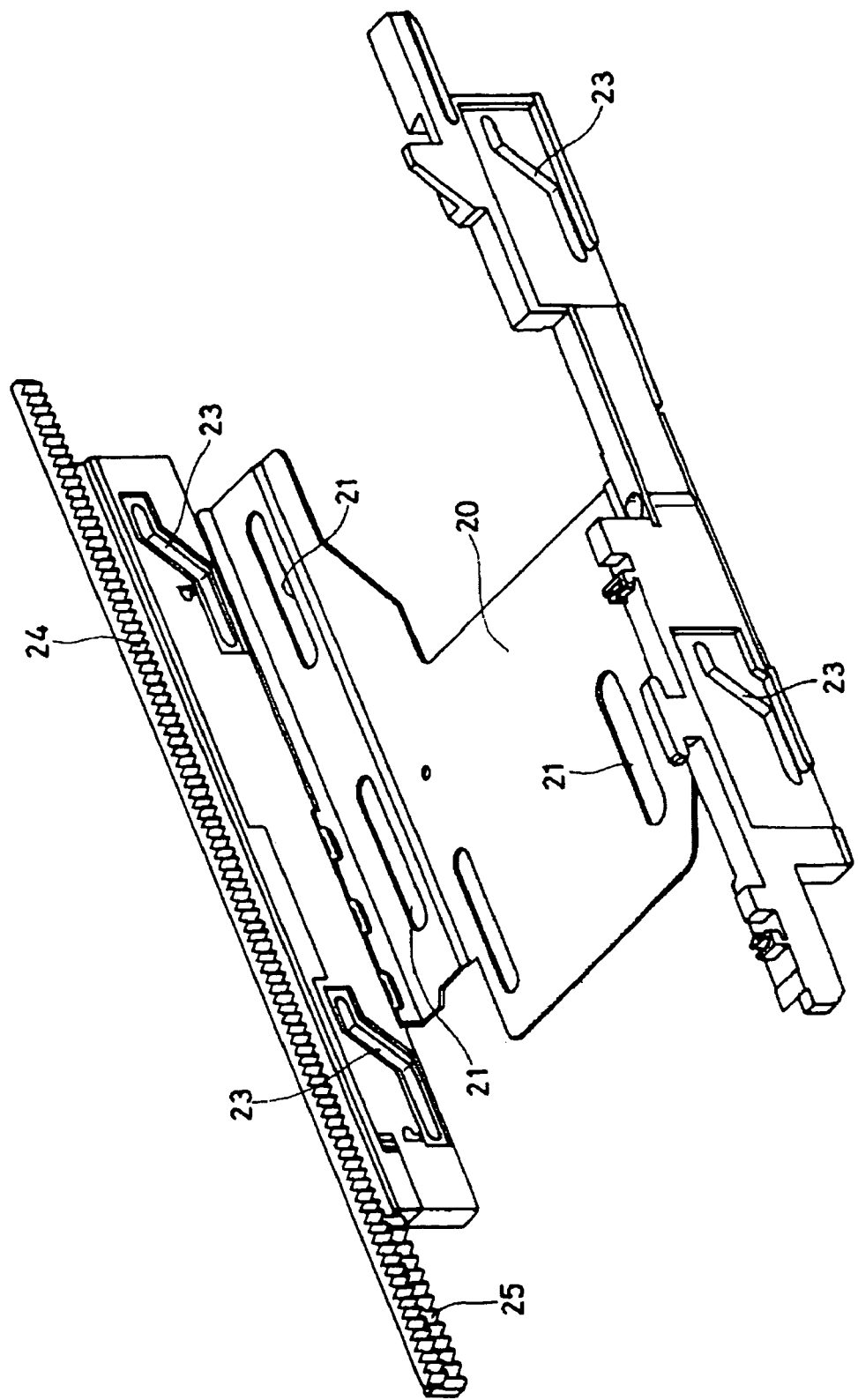
FIG. 4 is a perspective view of a chucking slider.

As shown in FIGS. 3 and 4, a chucking slider 20 is mounted inside the external chassis 10. The chucking slider 20 comprises left and right wall sections and a center connecting section. The connecting section has long holes 21 that extend in the slide direction. The long hole 21 engages with a screw 22 fixed to the external chassis, supporting the chucking slider 20 capable of sliding in the long direction of the tray 13.

The chucking slider 20 contains a pair of cam grooves 23 at the front and the rear on each of both wall sections. A rack 24 is formed on a side of one of wall sections for moving the tray 13 in a self-propelled manner. An emergency ejecting rack 25 is provided below the rack 24 at its front end. If the drive section for the tray 13 fails and cannot eject the tray 13, the rack 25 engages with the emergency ejecting pinion (to be described) to eject the tray 13.

Configuration of a Base Unit 30

Figure 2:
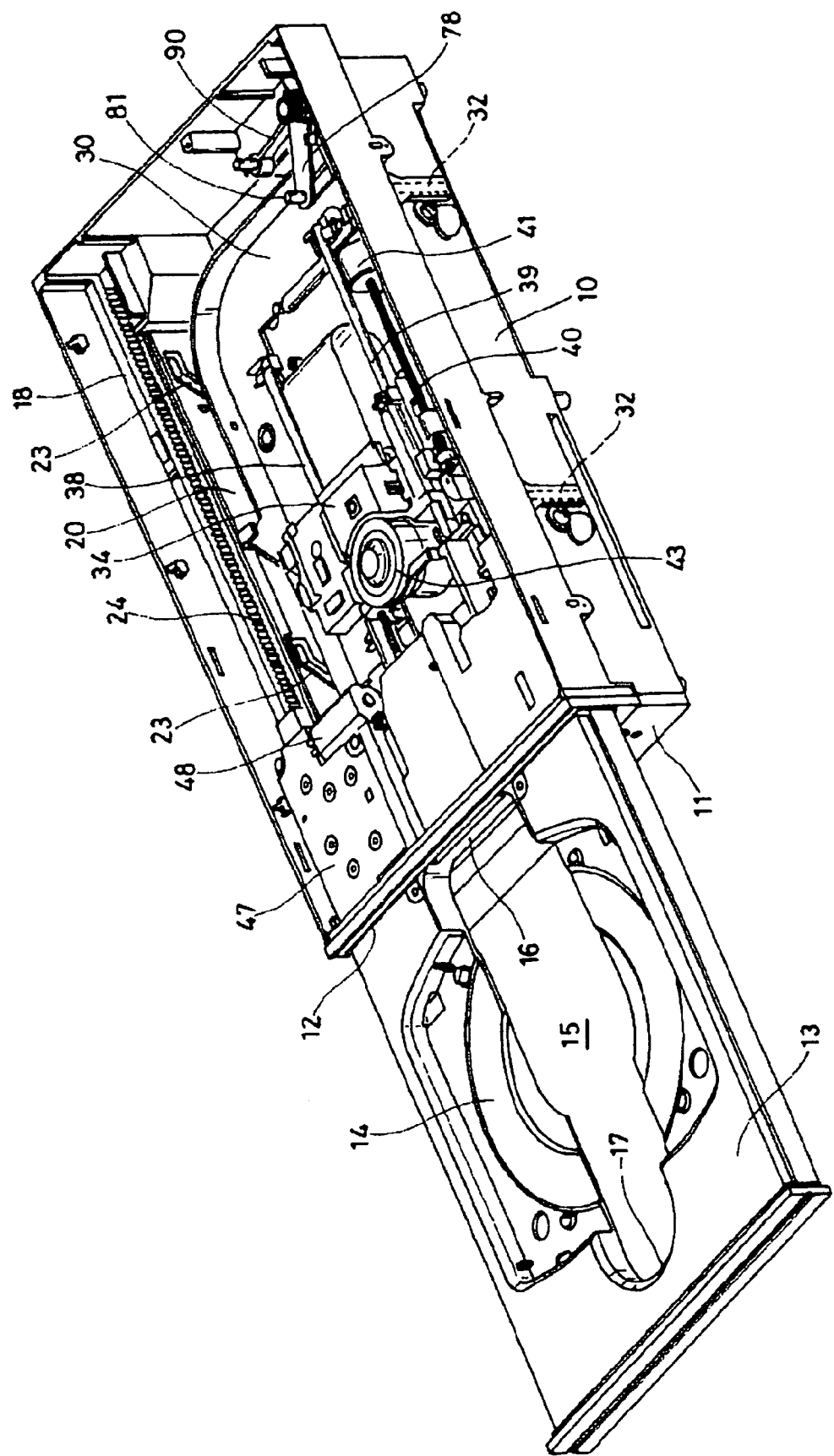
FIG. 2 is a perspective view of the disk recording-reproducing apparatus with its tray pulled out.
Figure 5:
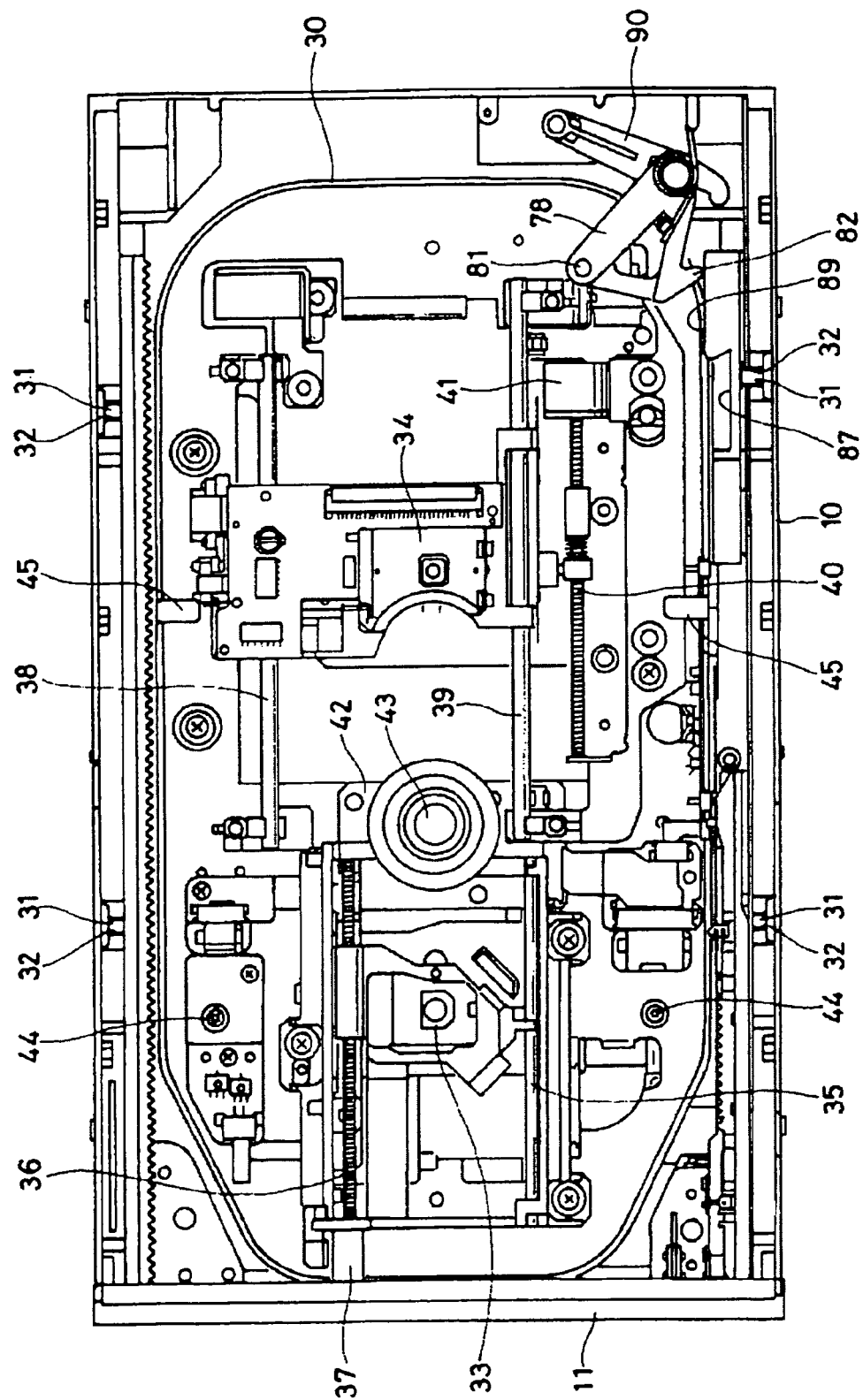
FIG. 5 is a plan view of the external chassis with a base unit installed.
Figure 6:
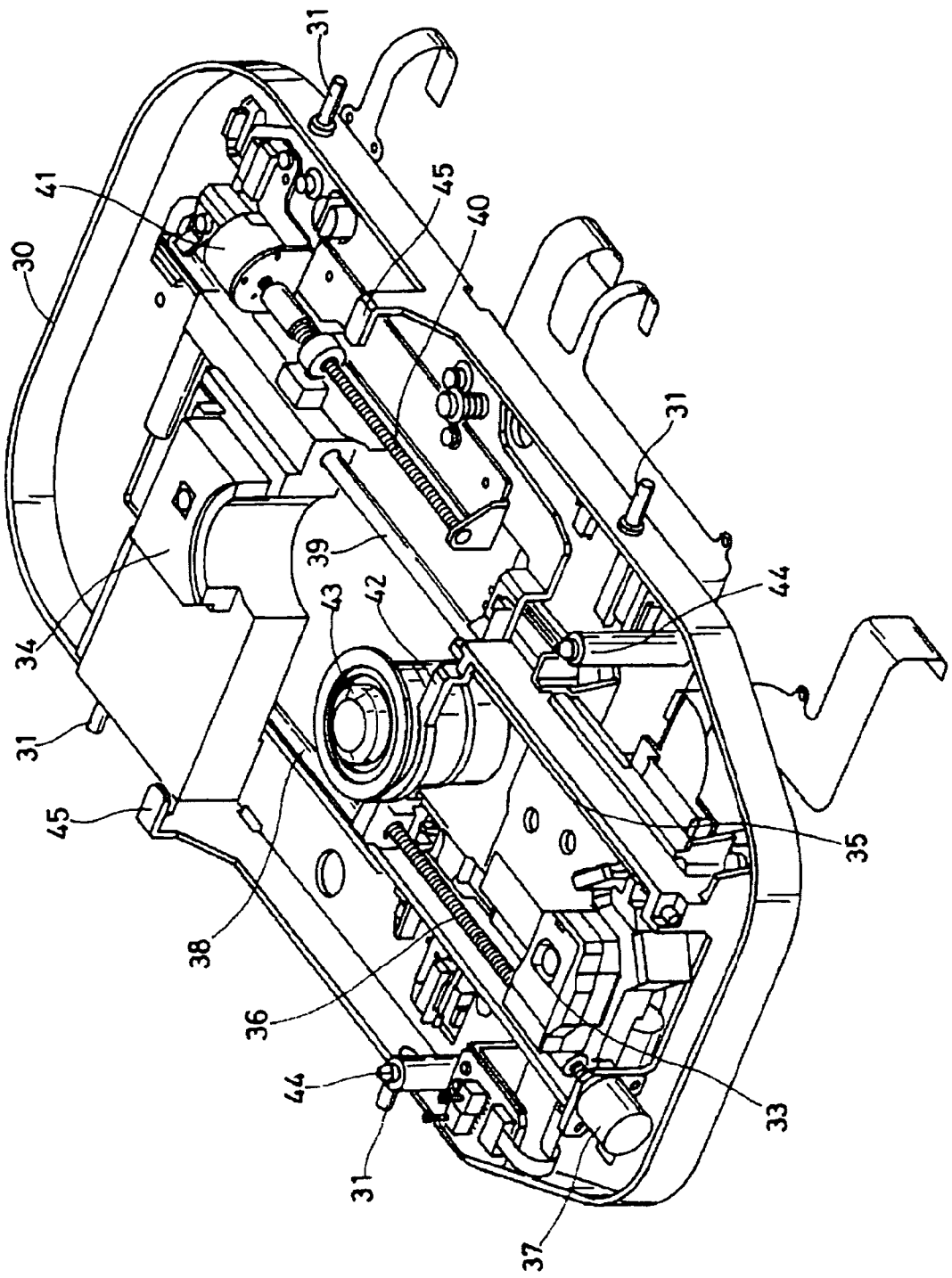
FIG. 6 is a perspective view of the base unit.

The base unit 30 is provided above the chucking slider 20 as shown in FIGS. 2 and 5. The base unit 30 is a flat container. Its both sides (left and right) are each provided with two pins 31. These pins 31 fit into the cam grooves 23 in both wall sections of the chucking slider 20. A tip of the pin 31 engages with a vertical slit 32 provided inside each of the both wall sections of the external chassis 10. According to this structure, the base unit 30 is supported so that it can freely move in the height direction. The cam groove 23 of the chucking slider 20 limits the height of the base unit 30.

There are provided a DVD optical pickup 33 and a DVR optical pickup 34 on the base unit 30. The DVD optical pickup 33 is guided by a guide lock 35 and a feed screw 36. A stepping motor 37 is provided at the end of the feed screw 36. When the stepping motor 37 is driven, the feed screw 36 allows the DVD optical pickup 33 to move in the radial direction of a disk-shaped recording medium.

On the other hand, a pair of guide locks 38 and 39 support the DVR optical pickup 34. A stepping motor 41 drives a feed screw 40 to move the DVR optical pickup 34 in the radial direction of the disk-shaped recording medium.

The optical pickups 33 and 34 are respectively located at the front and rear of the turntable 43 mounted on the base unit 30 via a bracket 42. That is to say, the DVD optical pickup 33 is located toward the ejecting direction with reference to the turntable 43. The DVR optical pickup 34 is located toward the inserting direction with reference to the turntable 43.

Figure 7:
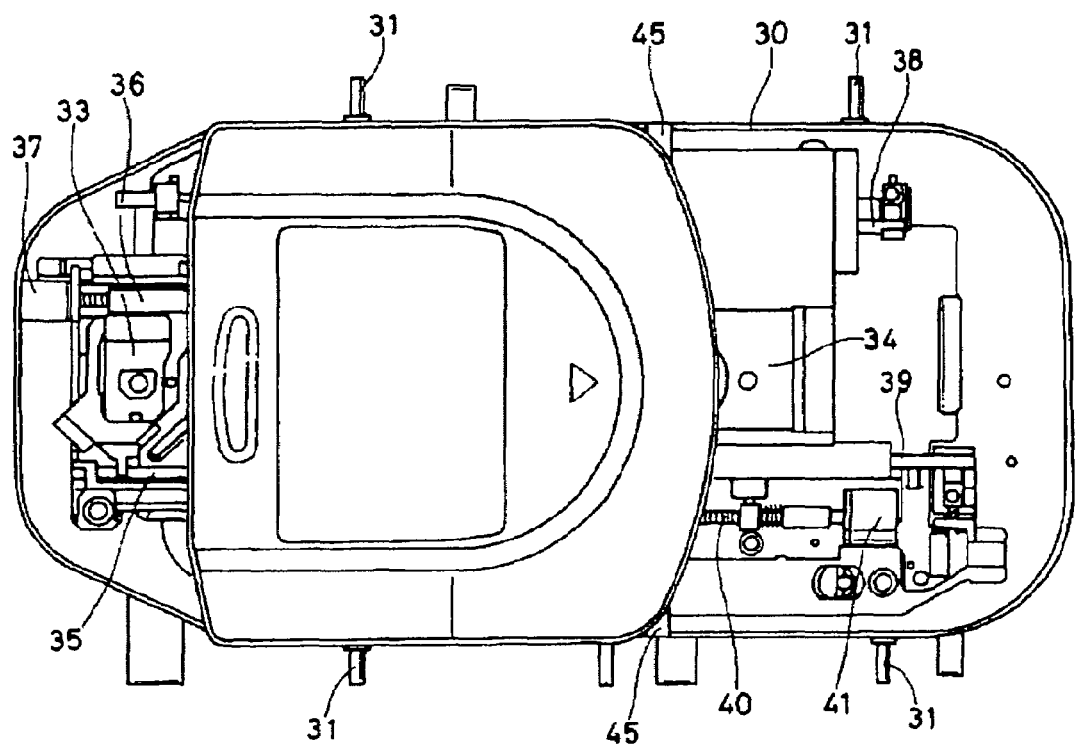
FIG. 7 is a plan view of the base unit with a DVR cartridge mounted.
Figure 8:
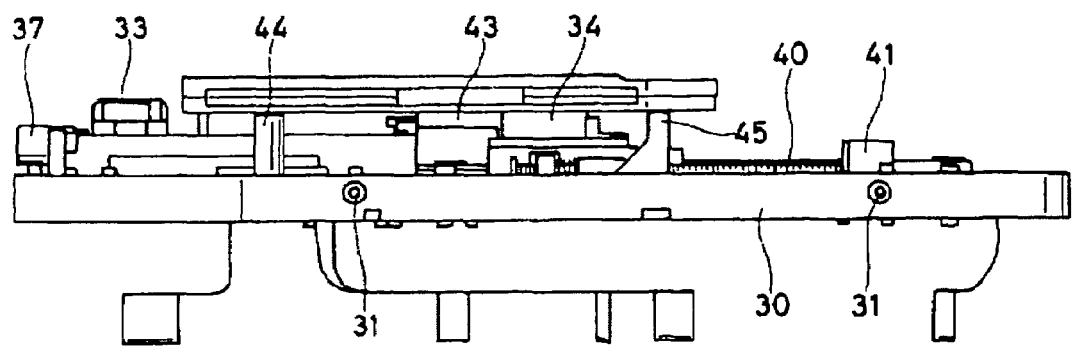
FIG. 8 is a side view of the base unit with the DVR cartridge mounted.
Figure 9:
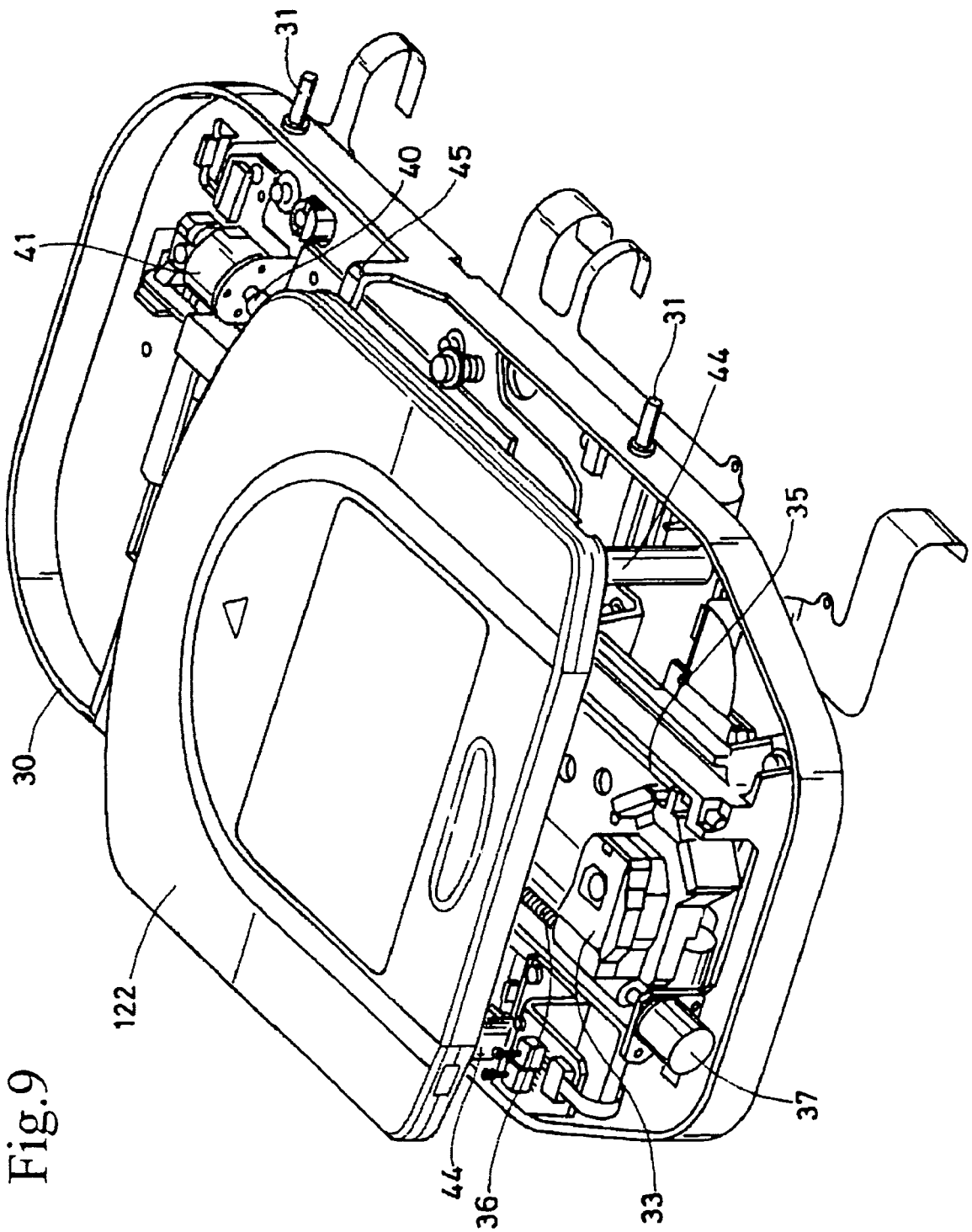
FIG. 9 is a perspective view of the base unit with the DVR cartridge mounted.
Figure 10:
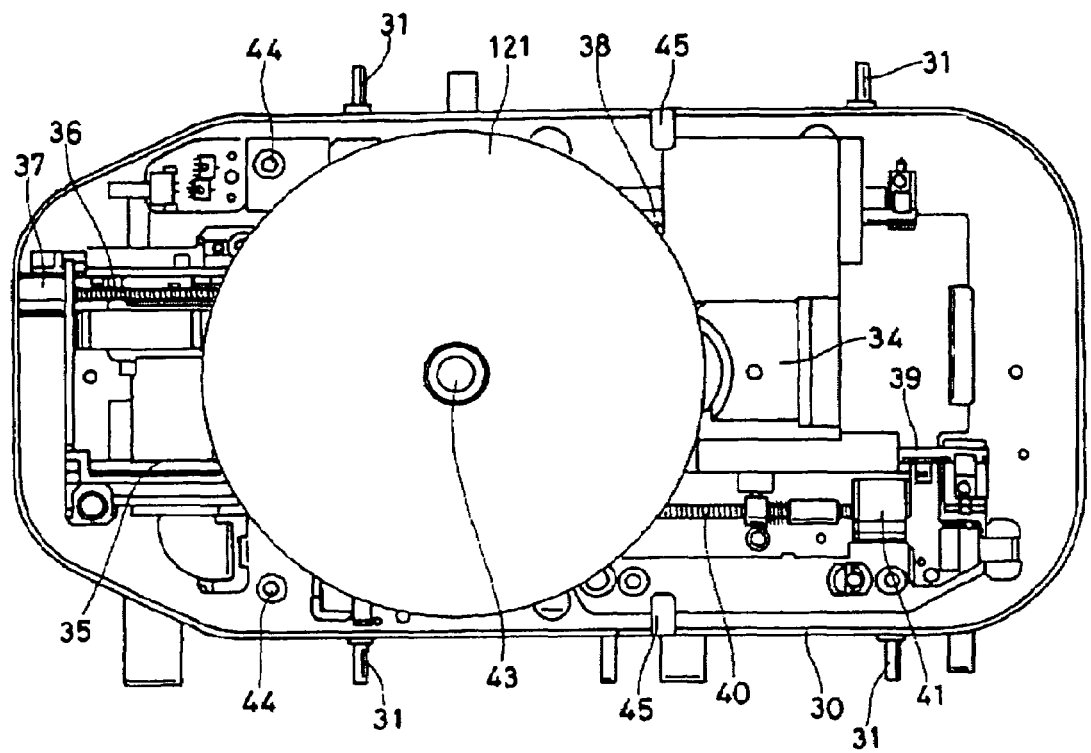
FIG. 10 is a plan view of the base unit mounted with a bare disk.
Figure 11:
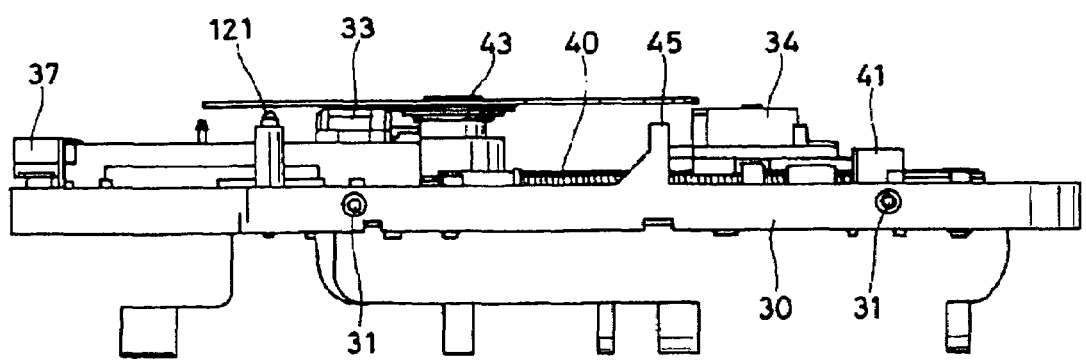
FIG. 11 is a side view of the base unit mounted with a bare disk.
Figure 12:
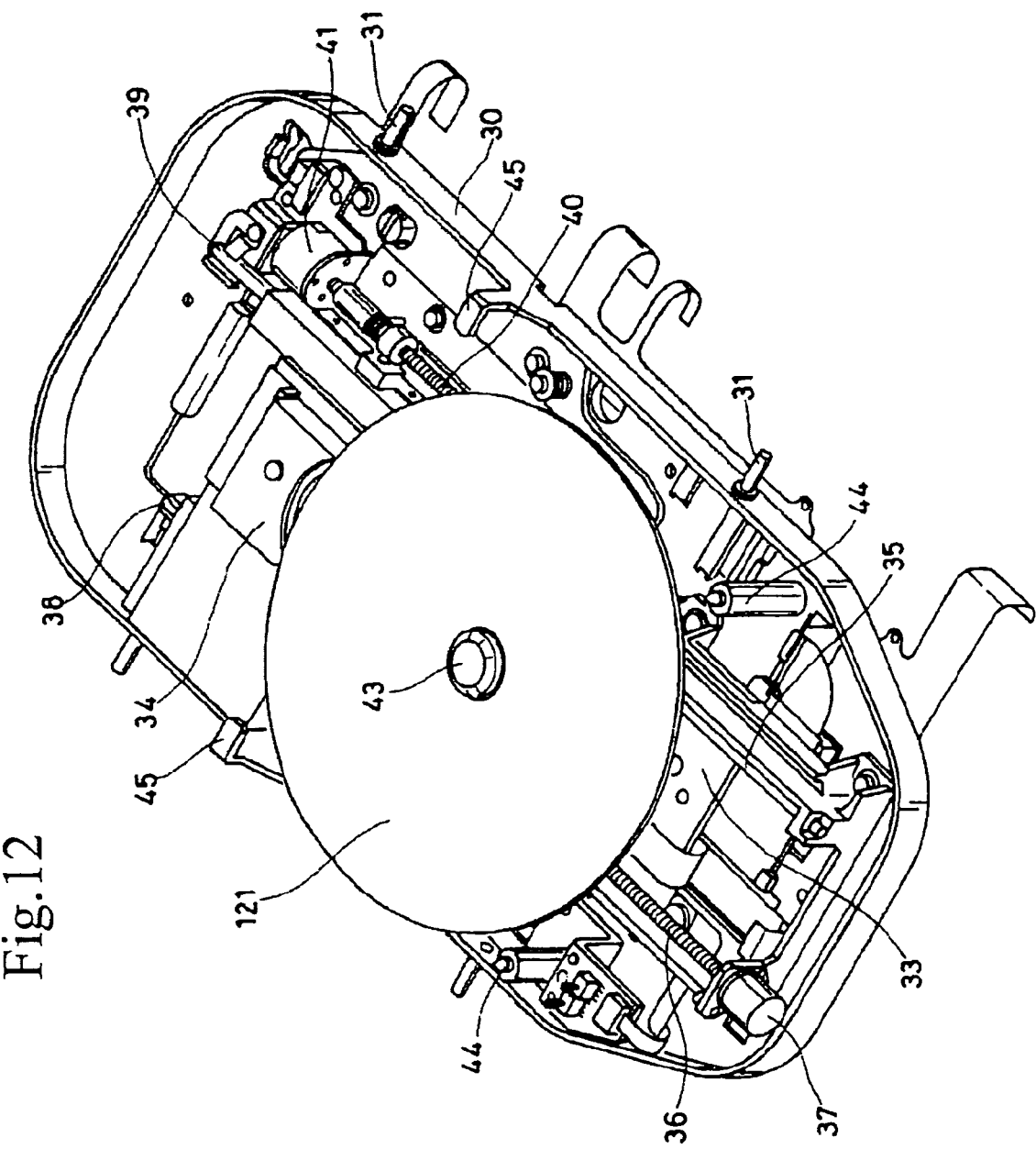
FIG. 12 is a perspective view of the base unit mounted with a bare disk.

The base unit 30 is provided with a pair of support pins 44 and support arms 45 on both sides. FIGS. 7 through 9 show that the tray 13 pulls the DVR cartridge 122 into the chassis by means of the support pins 44 and the support arms 45. In this case, the base unit 30 rises and floats the cartridge 122 from the tray 13 for supporting. The bare disk 121 is not supported by the support pins 44 and the support arms 45. As shown in FIGS. 10 through 12, the turntable 43 supports the bare disk 121 at its center.

Configuration of a Drive Section 46 for the Tray 13

Figure 13:
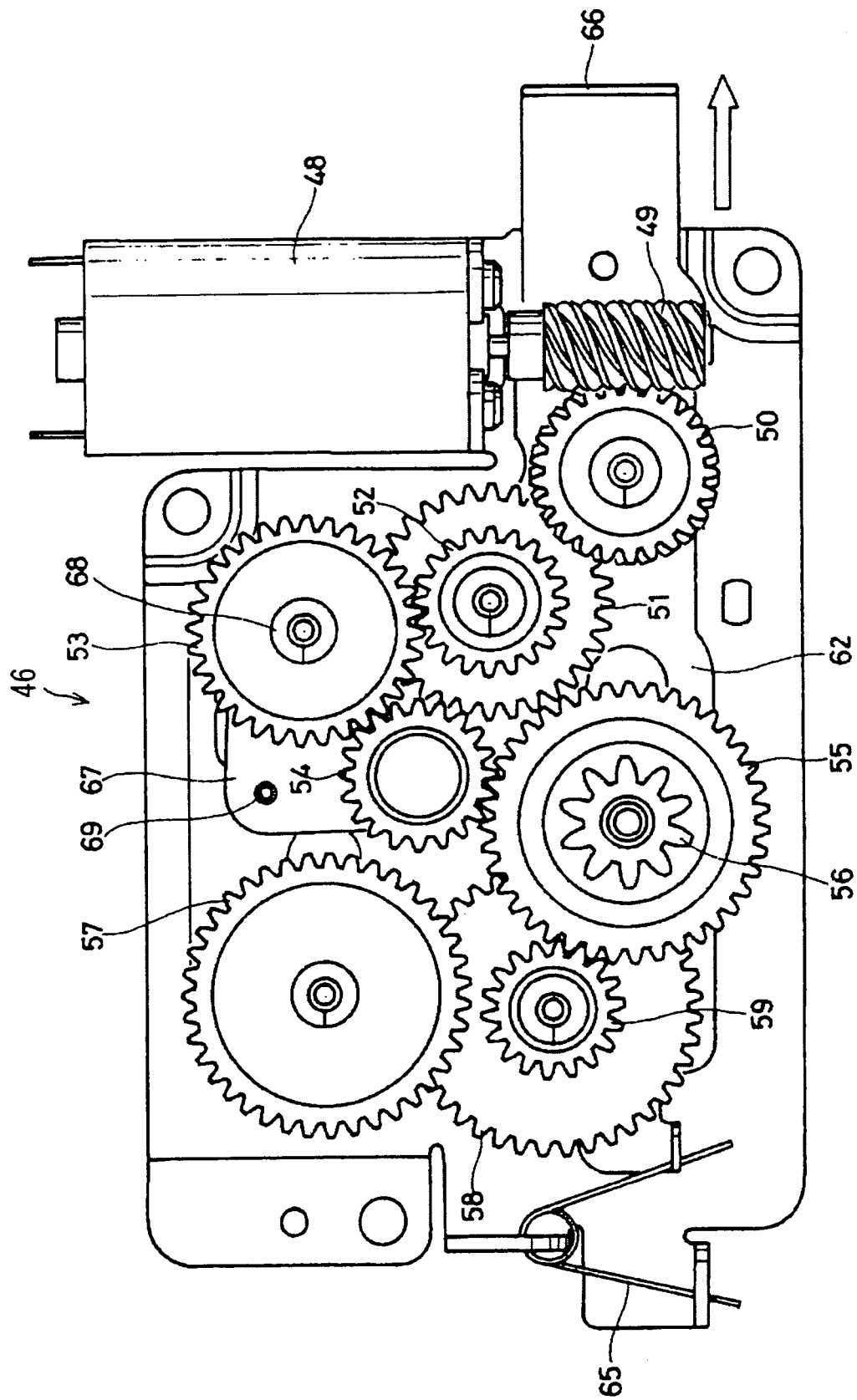
FIG. 13 is a bottom plan view of a tray drive section.

Referring now to FIGS. 13 through 17, the following describes the structure of the drive section 46 mounted on the tray 13 for self-propelling the tray 13. A motor 48 is mounted on a chassis 47 constituting the drive section 46. As shown in FIG. 13, a worm gear 49 is fixed to an output shaft of the motor 48. The worm gear 49 engages with a worm wheel gear 50. The worm wheel gear 50 has a concentric gear which engages with a gear 51. A gear 52 concentric with the gear 51 engages with a gear 53. The gear 53 engages with a gear 54 that can oscillate. The gear 54 engages with a gear 55 to which a pinion 56 is fixed concentrically.

When the gear 54 oscillates, it engages with another gear 57. The gear 57 has a concentric gear which engages with a gear 58. A gear 59 concentric with the gear 58 engages with the gear 55.

Figure 15:
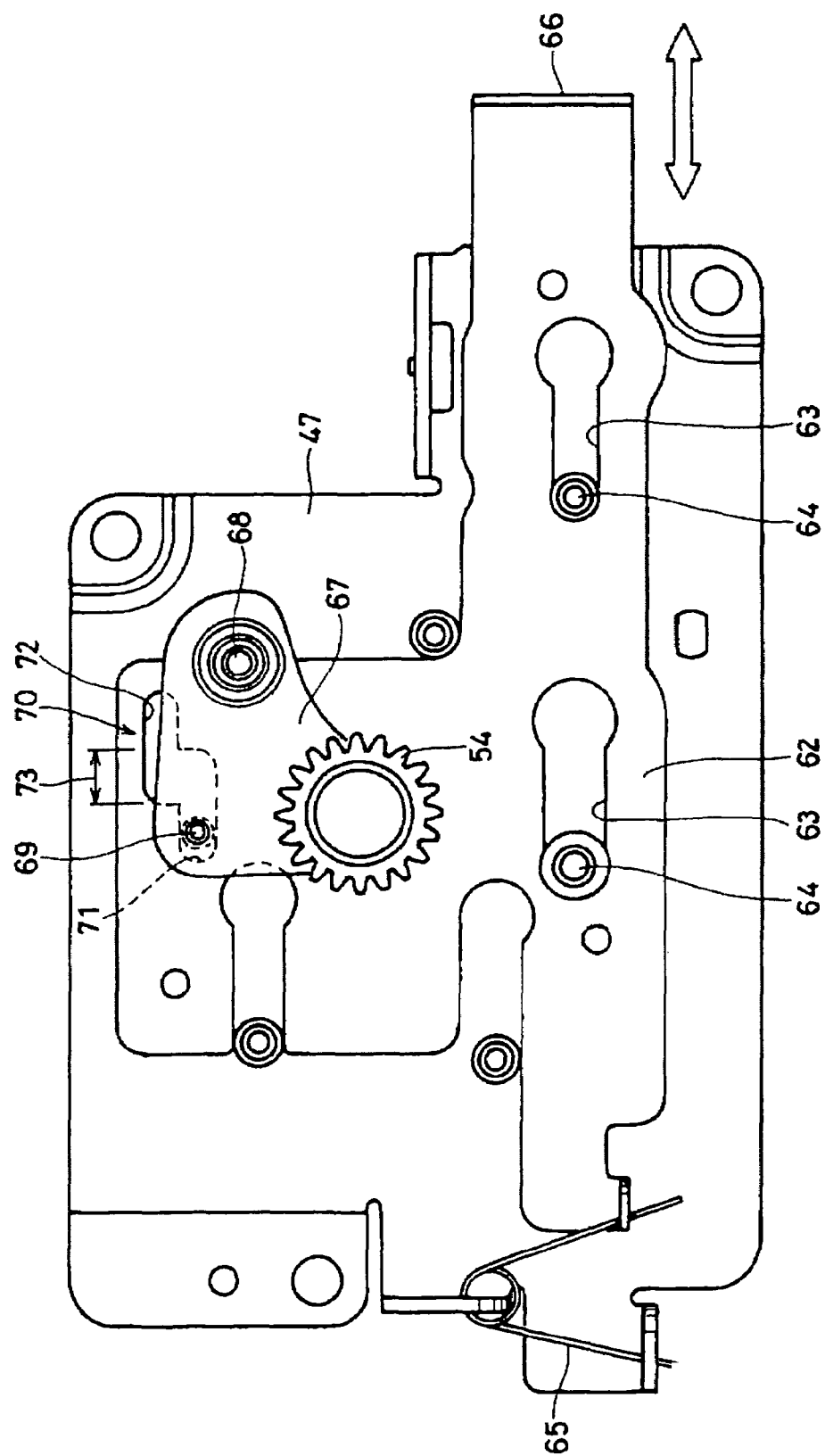
FIG. 15 is a bottom plan view showing a changeover operation of a changeover plate.

The oscillating mechanism of the gear 54 will now be described. As shown in FIG. 15, the chassis 47 is provided with a changeover plate 62. A long hole 63 engages with a pin 64 planted on the chassis 47. Accordingly, the changeover plate 62 is supported so that it can slide horizontally in FIG. 15. In addition, a spring 65 applies a sliding force to the changeover plate 62 toward the right in FIG. 15. The right end of the changeover plate 62 is bent to form a contact section 66.

Figure 16:
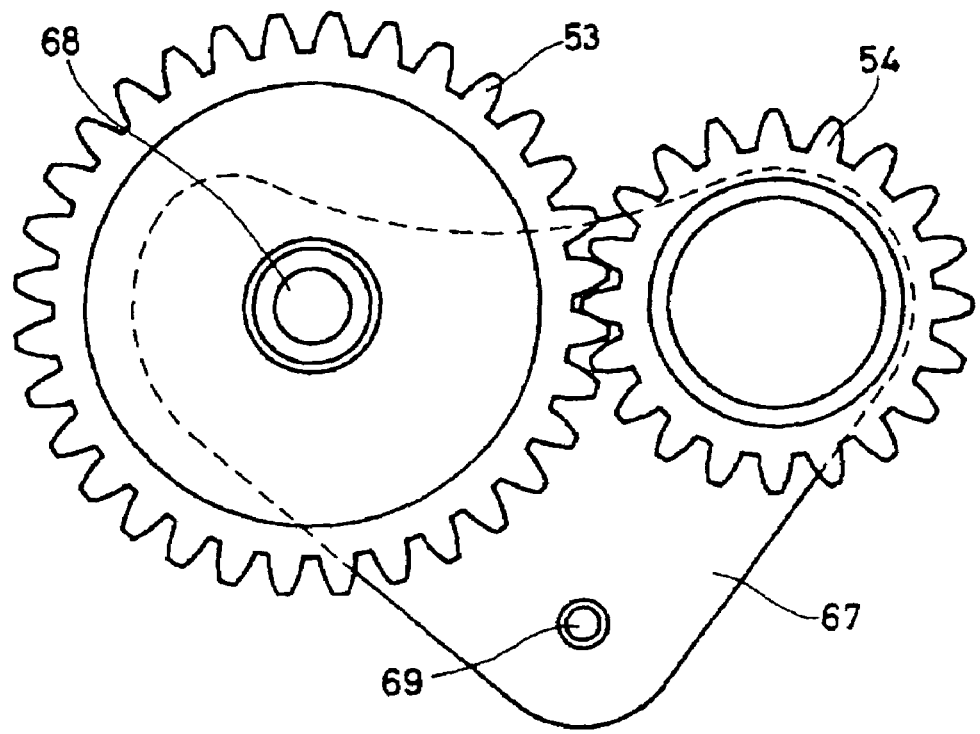
FIG. 16 is an enlarged plan view showing an oscillating lever and an oscillating gear.

An oscillating lever 67 in FIG. 16 is rotatively supported on the chassis 47 around a pivot 68. A forcing shaft 69 is planted on the oscillating lever 67 and engages in a coupling hole 70 in the changeover plate 62. The coupling hole 70 comprises limiting sections 71 and 72 at its both ends. A middle of the limiting sections 71 and 72 forms a wide oscillating section 73.

Figure 14:
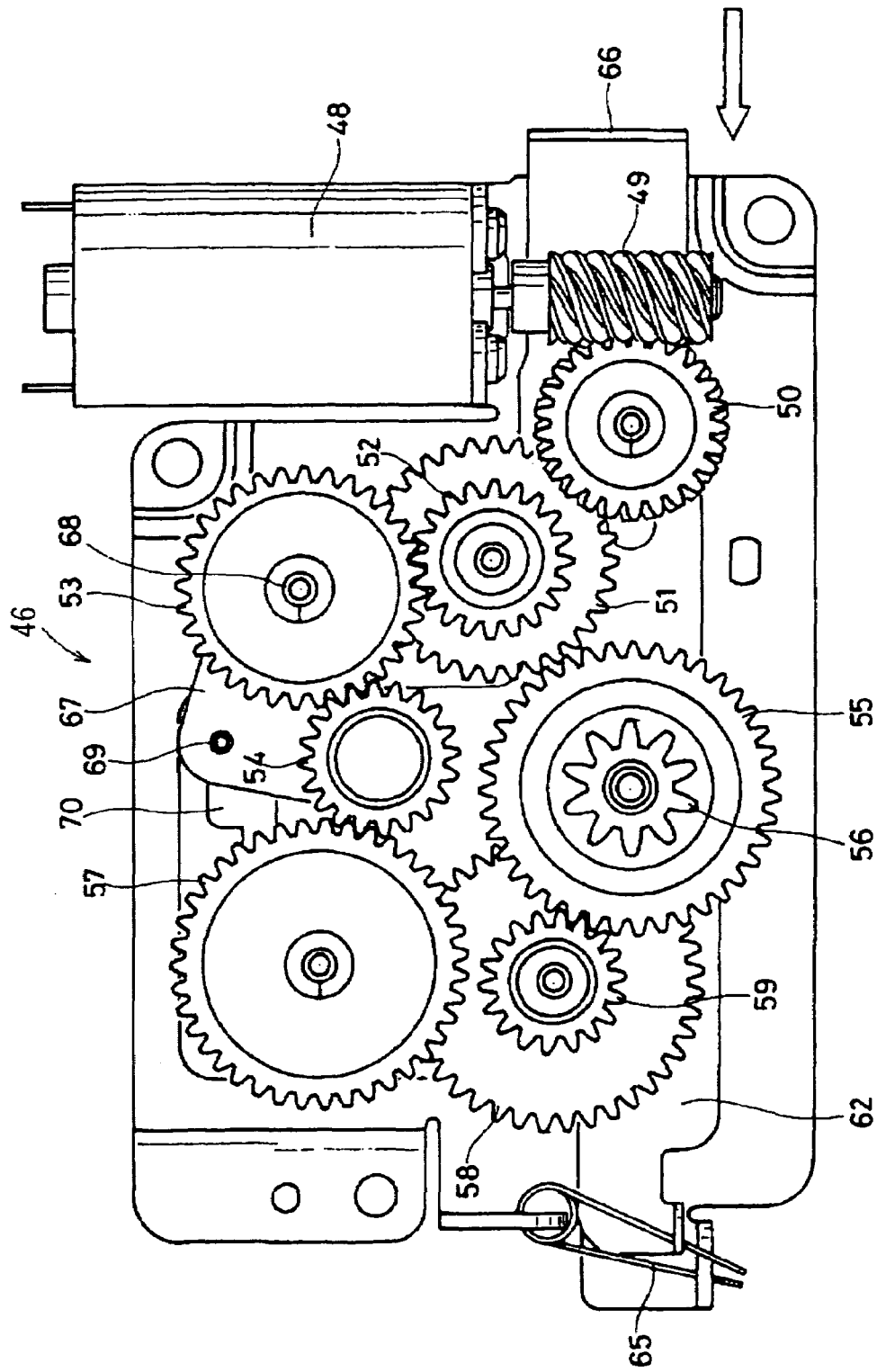
FIG. 14 is a bottom plan view of the tray drive section after changeover.
Figure 17:
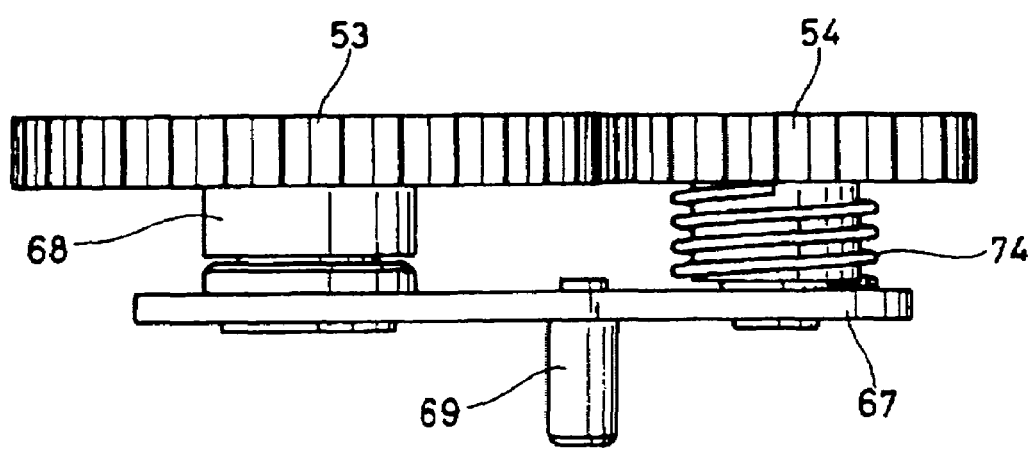
FIG. 17 is an enlarged front view showing the oscillating lever and the oscillating gear.

When the forcing shaft 69 engages with one limiting section 71, the gears 54 and 55 engage with each other as shown in FIG. 13. When the forcing shaft 69 is positioned to the other limiting section 72, the gears 54 and 57 engage with each other as shown in FIG. 14. As shown in FIG. 17, the gear 54 has a helical compression spring 74 around its support shaft. The helical compression spring 74 applies a rotative load to the gear 54. When the gear 53 rotates, the gear 54 oscillates in the rotating direction.

Lock Mechanism of the Tray 13 and the Chucking Slider 20

Figure 18:
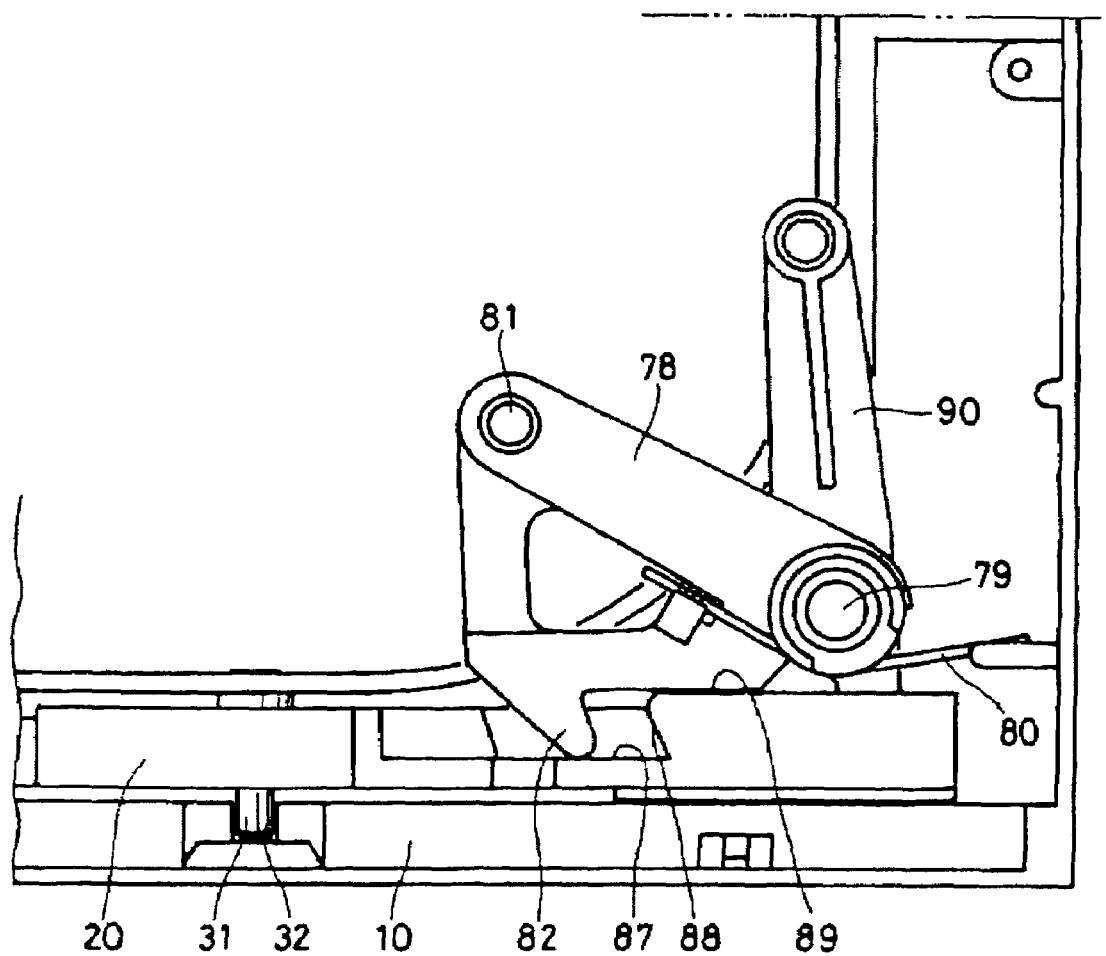
FIG. 18 is a plan view of a lock lever.

With reference to FIG. 18, the following describes a lock lever 78 that locks the tray 13 and the chucking slider 20. A support shaft 79 is planted at the bottom rear of the external chassis 10. The support shaft 79 rotatively supports the lock lever 78. As shown in FIG. 18, a helical spring 80 rotatively moves the lock lever 78 counterclockwise around the support shaft 79. The lock lever 78 is provided with a lock pin 81 for locking the tray 13 and a hook 82 for locking the chucking slider 20.

Figure 19:
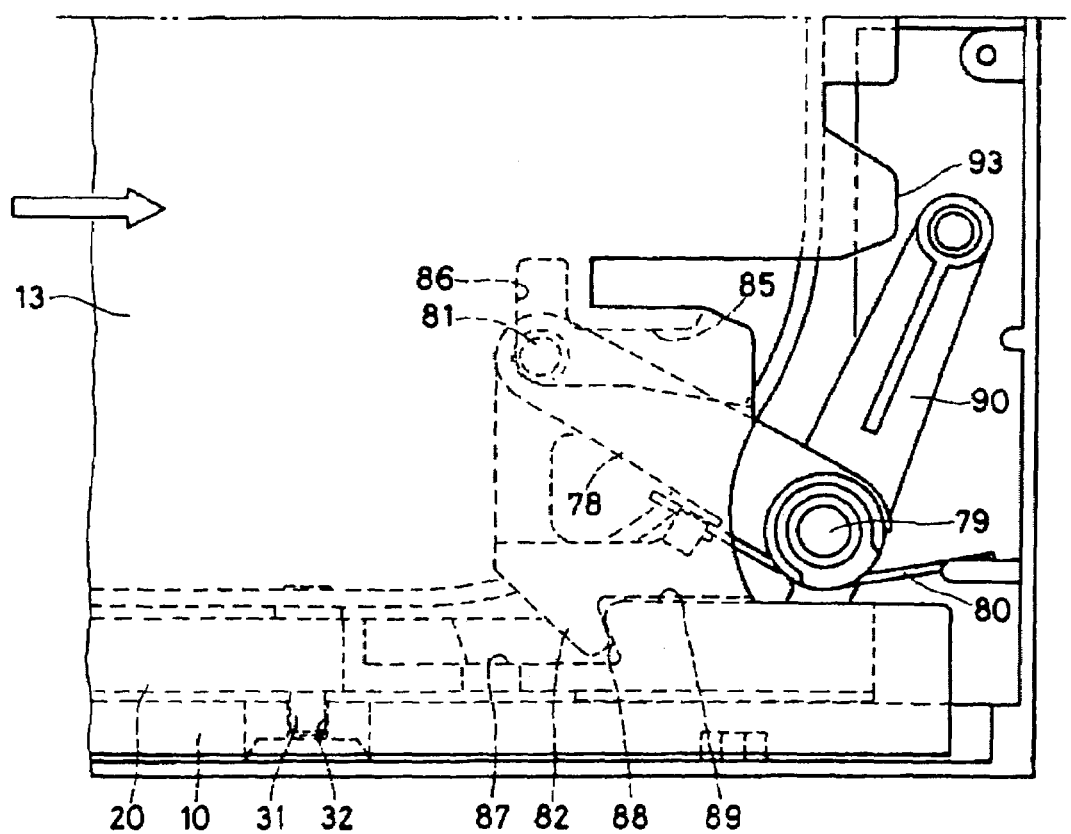
FIG. 19 is a plan view showing how the lock lever locks the chucking slider.

As shown in FIG. 19, an L-shaped lock groove 85 is formed on the bottom surface of the tray 13 at the rear thereof. The L-shaped lock groove 85 is bent at its end to form a lock section 86 (see FIG. 43).

Figure 20:
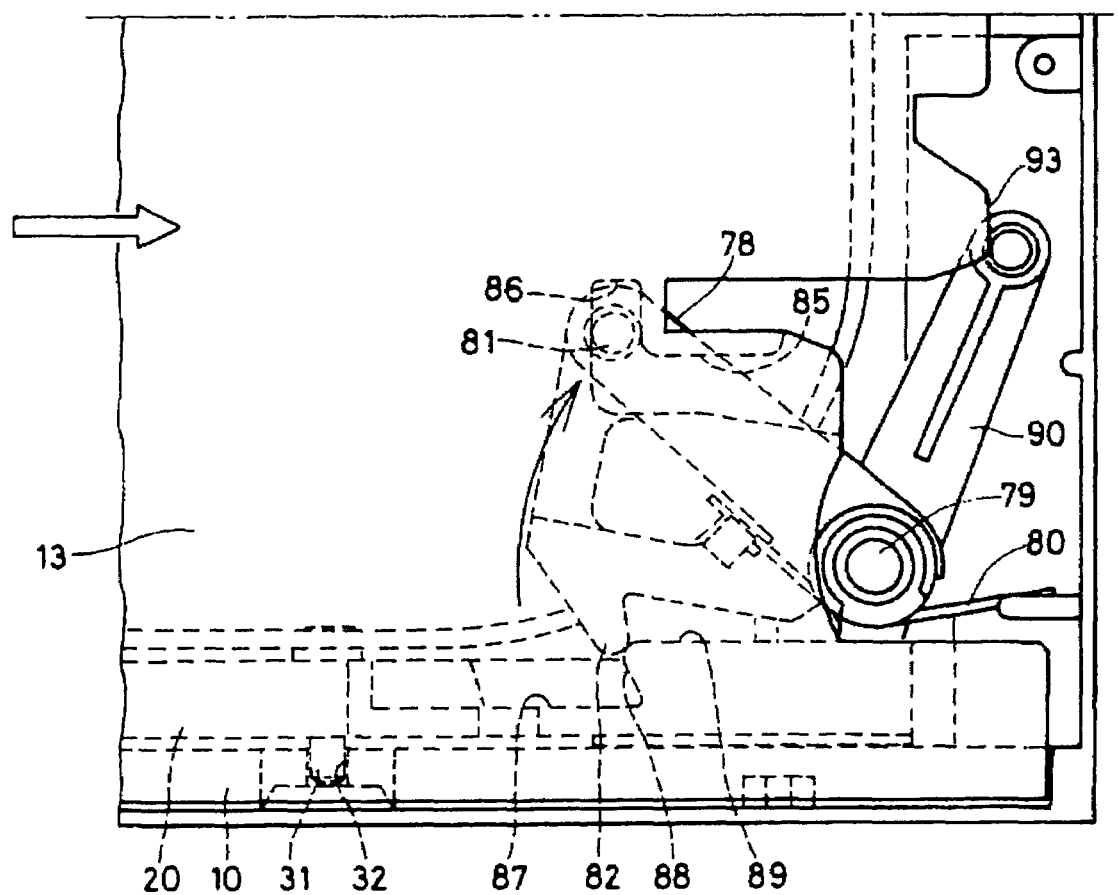
FIG. 20 is a plan view showing how the lock lever locks the tray.
Figure 21:
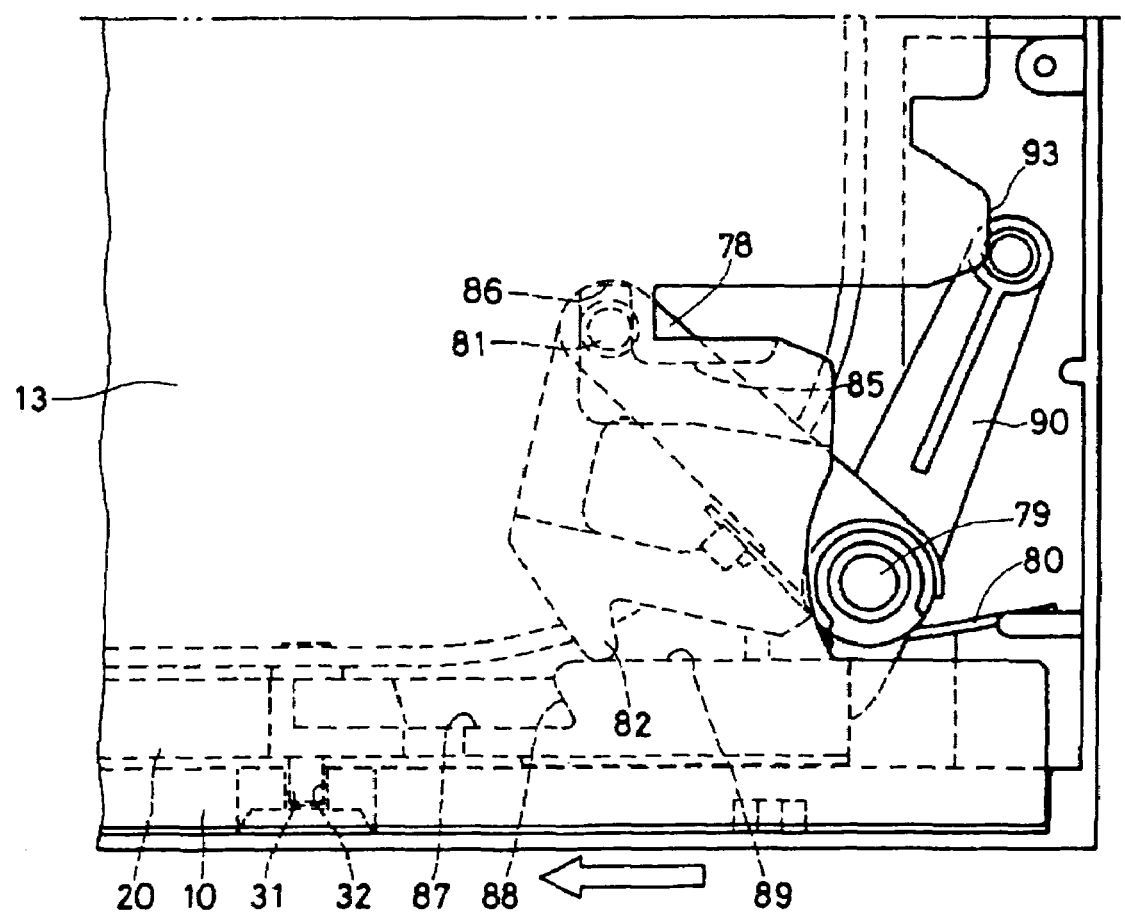
FIG. 21 is a plan view showing how a cam surface restricts the lock lever.

As shown in FIG. 19, a recessed section 87 is formed at the rear end of the chucking slider 20 on the right side thereof. The end of the recessed section 87 forms a flange 88. When the hook 82 of the lock lever 78 engages with the flange 88 of the recessed section 87, the chucking slider 20 is locked. A cam surface 89 is formed outside the flange 88 of the chucking slider 20. When the cam surface 89 restricts the hook 82, the lock lever 78 supports the tray 13 so that it is locked as shown in FIGS. 20 and 21.

Figure 22:
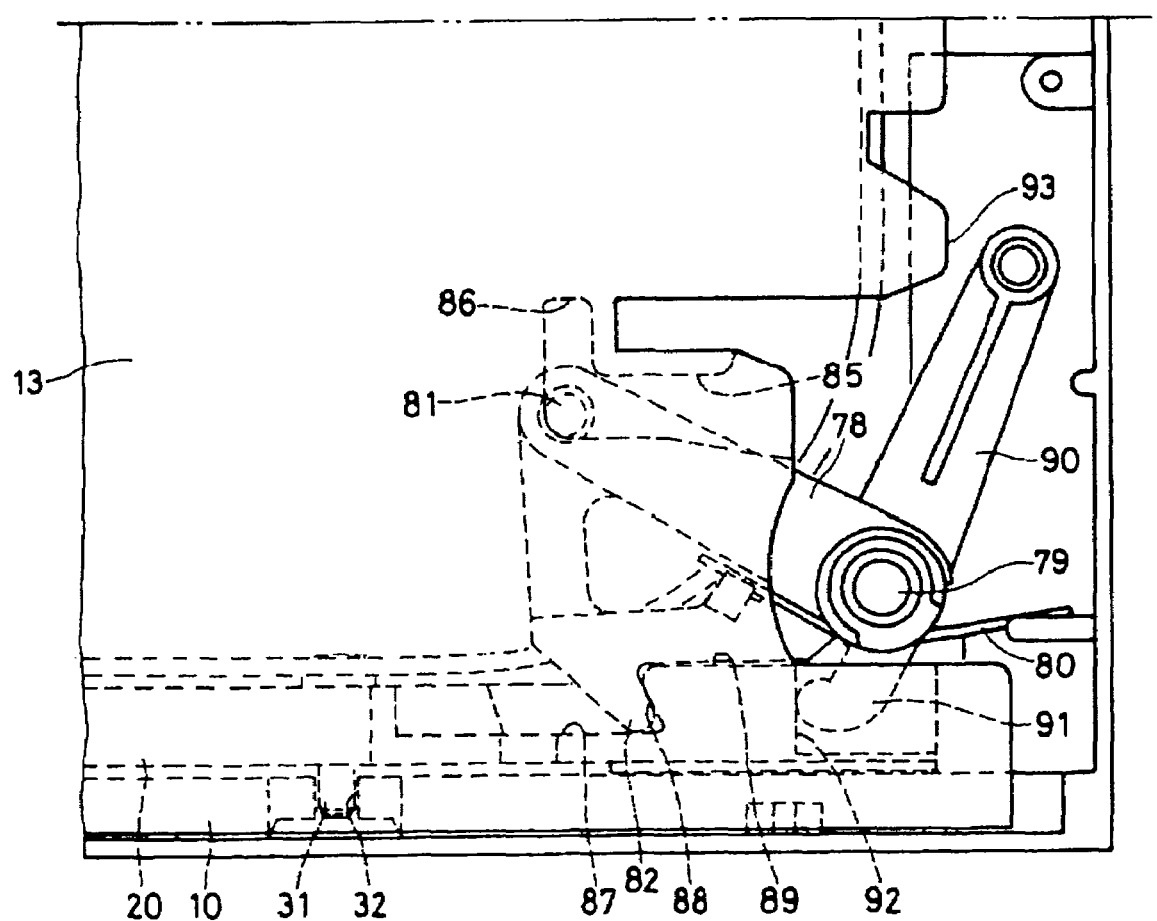
FIG. 22 is a plan view showing an arrangement of the chucking slider and the retracting lever.
Figure 23:
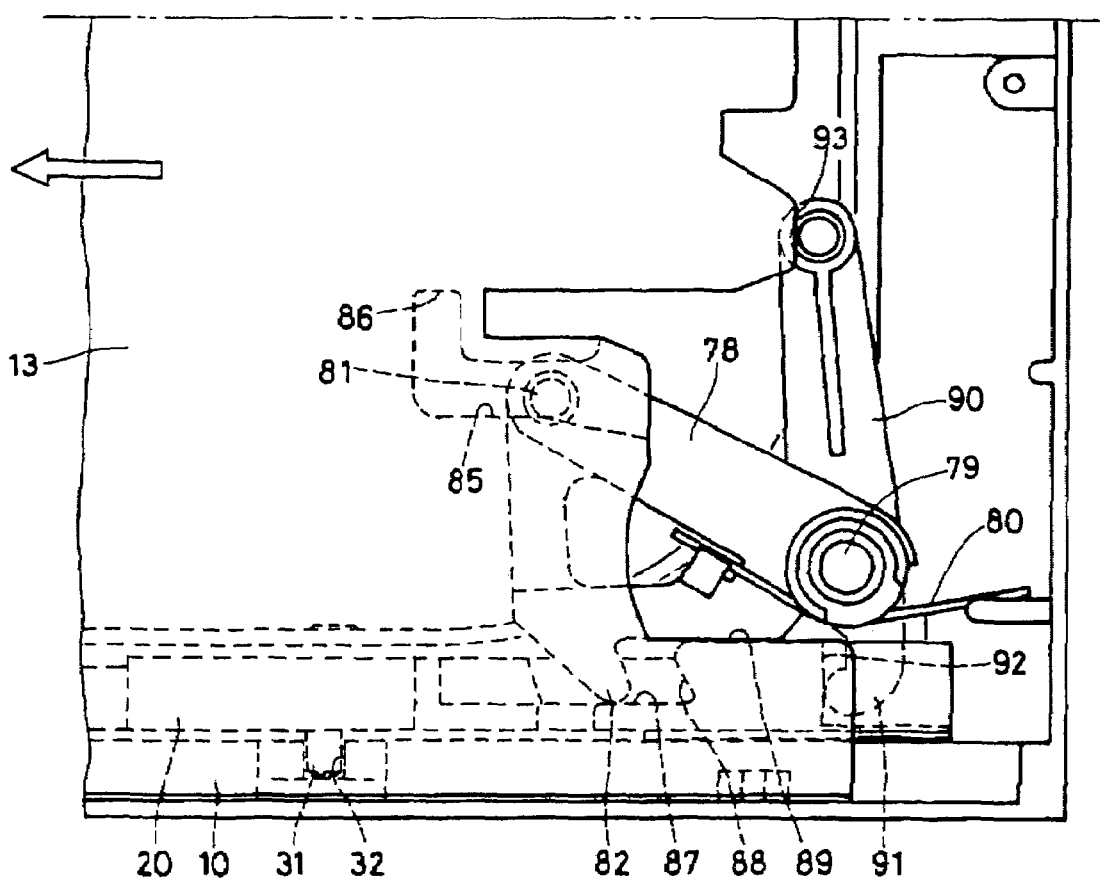
FIG. 23 is a plan view showing how the retracting lever retracts the tray.

The support shaft 79 concentrically and rotatably supports a retracting lever 90. One end of the retracting lever 90 forms a pressed section 91 that touches a step section 92 at the end of the chucking slider 20 as shown in FIGS. 22 and 23. The step section 92 of the chucking slider 20 presses to rotatively move the retracting lever 90 from the state in FIG. 22 to the state in FIG. 23. At this time, the retracting lever 90 presses a contact section 93 at the rear of the tray 13 to press the tray 13 for ejection. This operation is used for ejection by means of the emergency ejecting pinion.

Emergency Ejection Mechanism of the Tray 13

Figure 29:
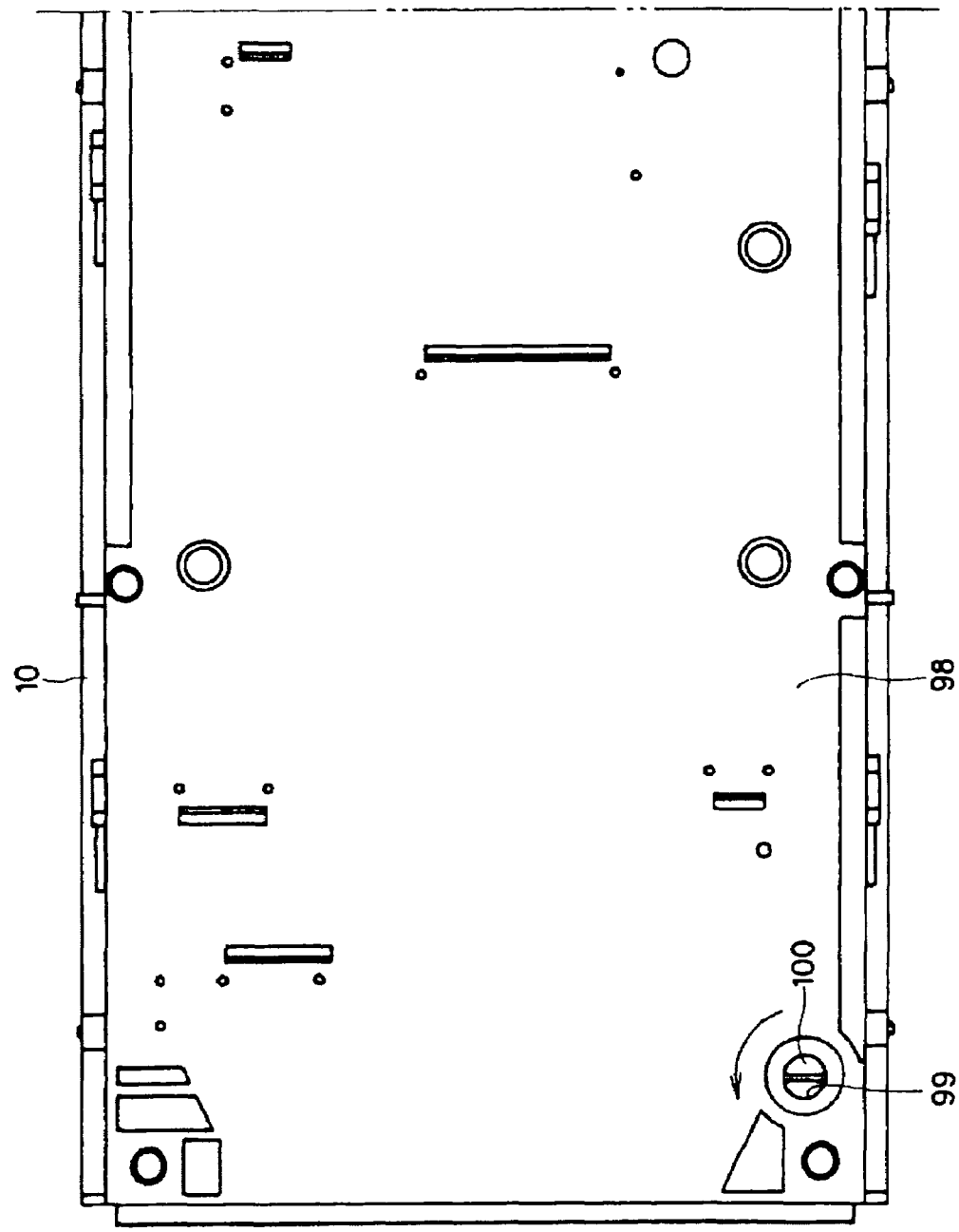
FIG. 29 is a bottom plan view of the external chassis.
Figure 30:
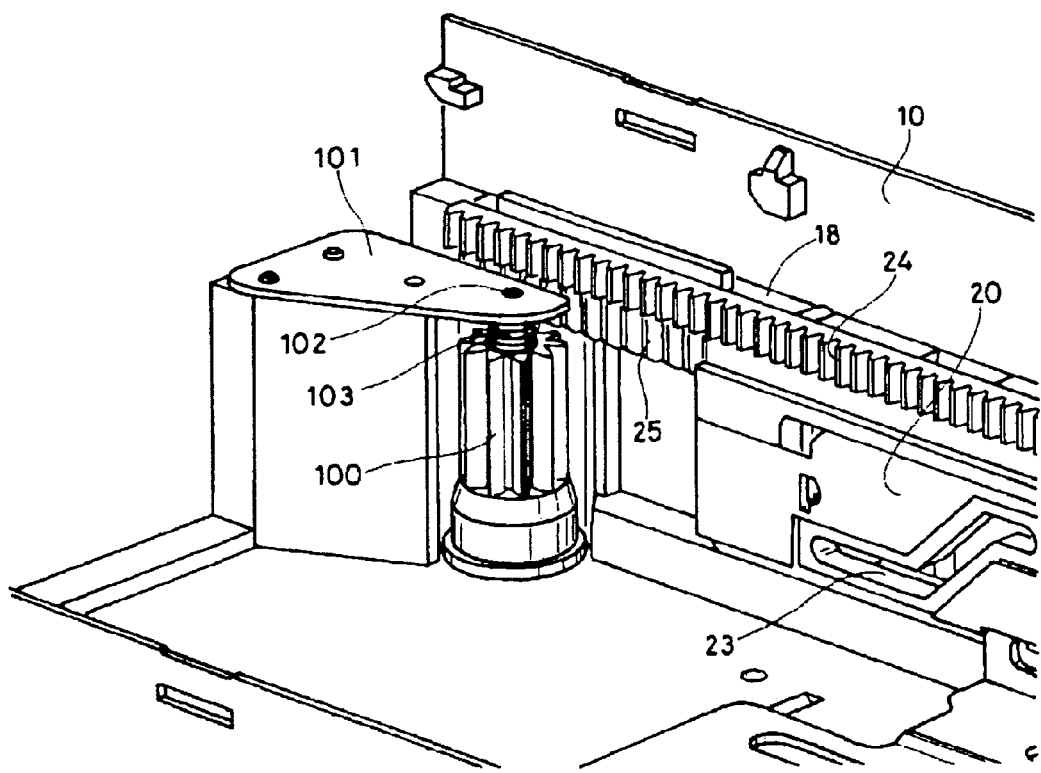
FIG. 30 is a perspective view of an emergency ejecting pinion.

Referring now to FIGS. 29 through 33, the following describes the structure for ejecting the tray 13 in an emergency, e.g., when the motor 48 of the drive section 46 for the tray stops rotating or when the drive section 46 fails. As shown in FIG. 29, a circular hole 99 is formed on a bottom surface 98 of the external chassis 10. As shown in FIG. 30, an emergency ejecting pinion 100 is provided at the front end of the external chassis 10 and on the side of the horizontal aperture 12 so that the emergency ejecting pinion 100 is located inside the circular hole 99.

Figure 32:
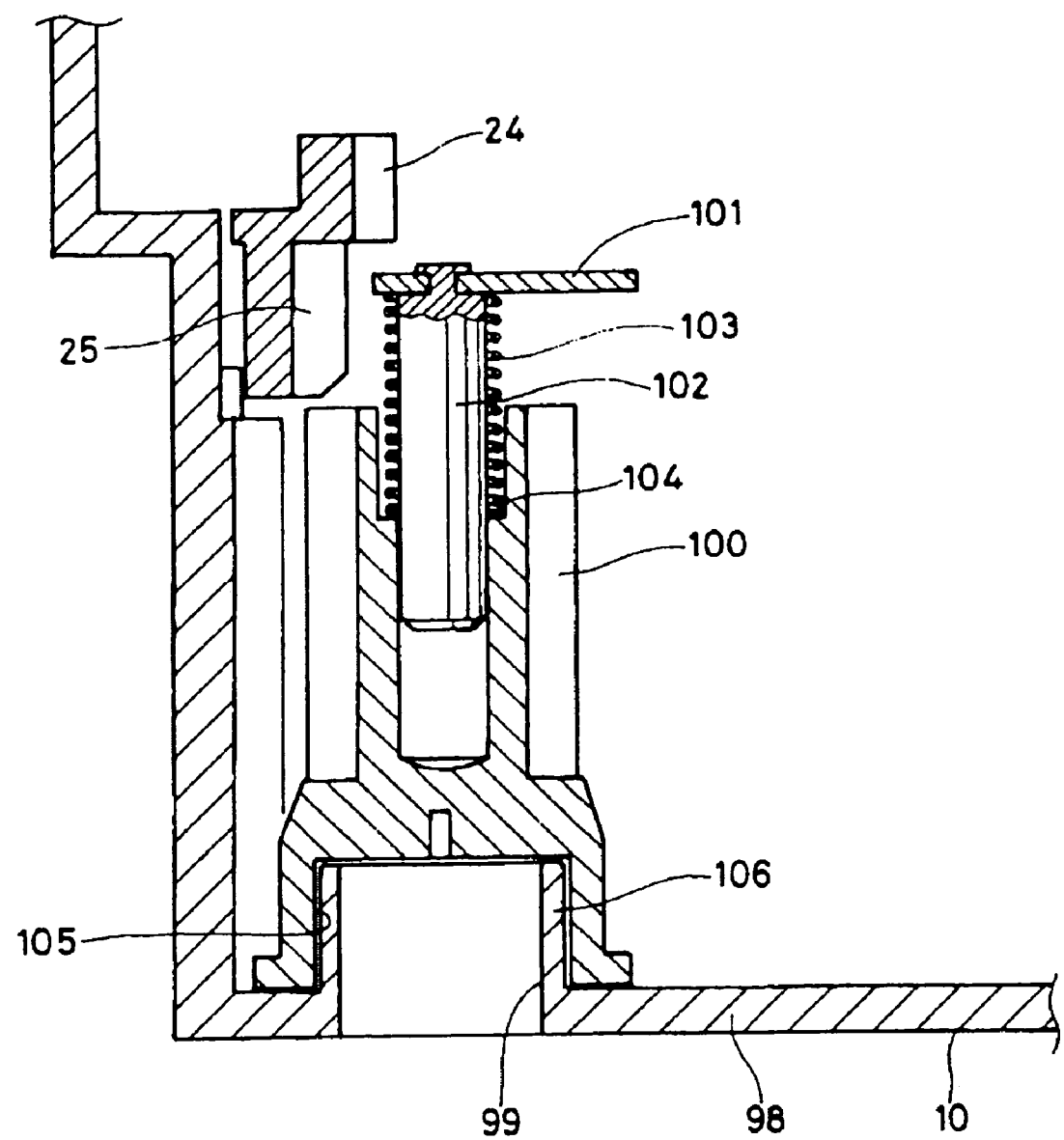
FIG. 32 is a vertical sectional view showing installation of the emergency ejecting pinion.

A bracket 101 is attached via a frame on a bottom plate of the external chassis 10. A support shaft 102 supported by the bracket 101 rotatably supports the emergency ejecting pinion 100 as shown in FIG. 32. In addition, the support shaft 102 is inserted into a helical compression spring 103 that engages with a step section 104 inside the pinion 100.

Figure 33:
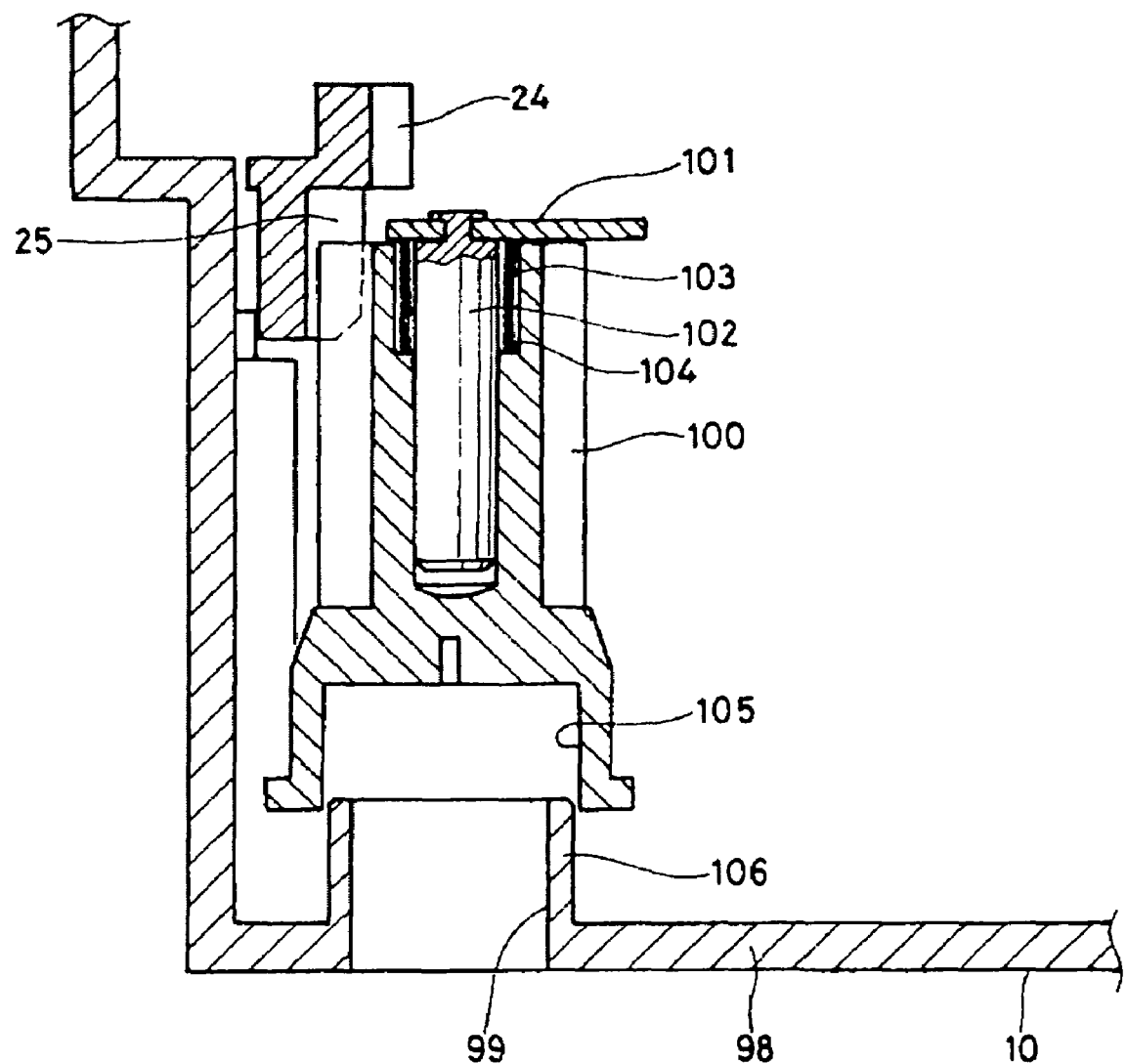
FIG. 33 is a vertical sectional view with the emergency ejecting pinion raised.

As shown in FIG. 32, a recessed section 105 is formed at the bottom of the pinion 100 and accepts a sleeve 106. The sleeve 106 engages with the recessed section 105 in the pinion 100 in order to ensure a dust-proof structure when the emergency ejecting pinion 100 is moved upward to be activated along the axis line as shown in FIG. 33. The pinion 100 engages with the emergency ejecting rack 25 so as to move the chucking slider 20.

Detection Mechanism for a Disk-shaped Recording Medium

Figure 34:
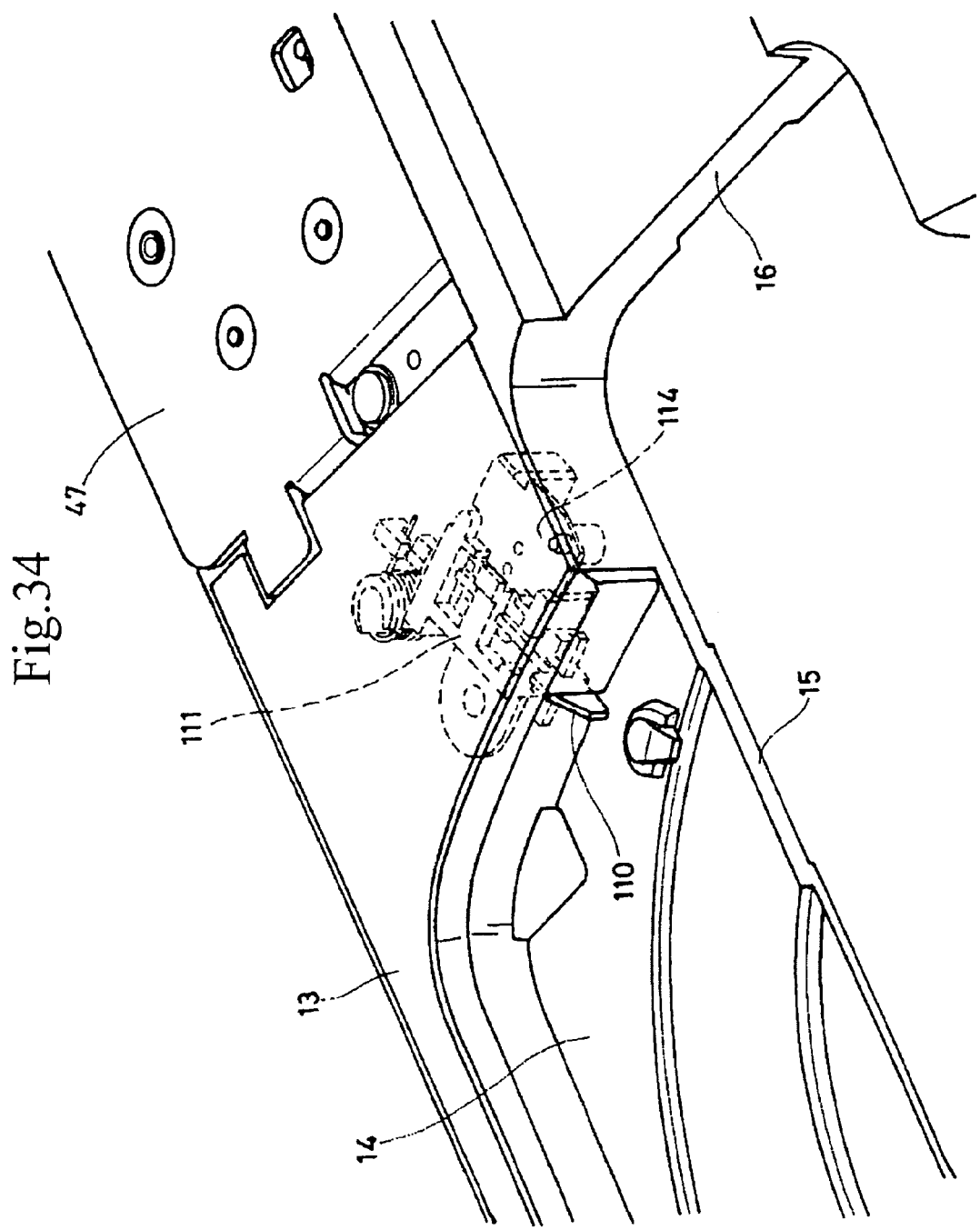
FIG. 34 is a partially perspective view showing a detection mechanism for a disk-shaped recording medium.
Figure 35:
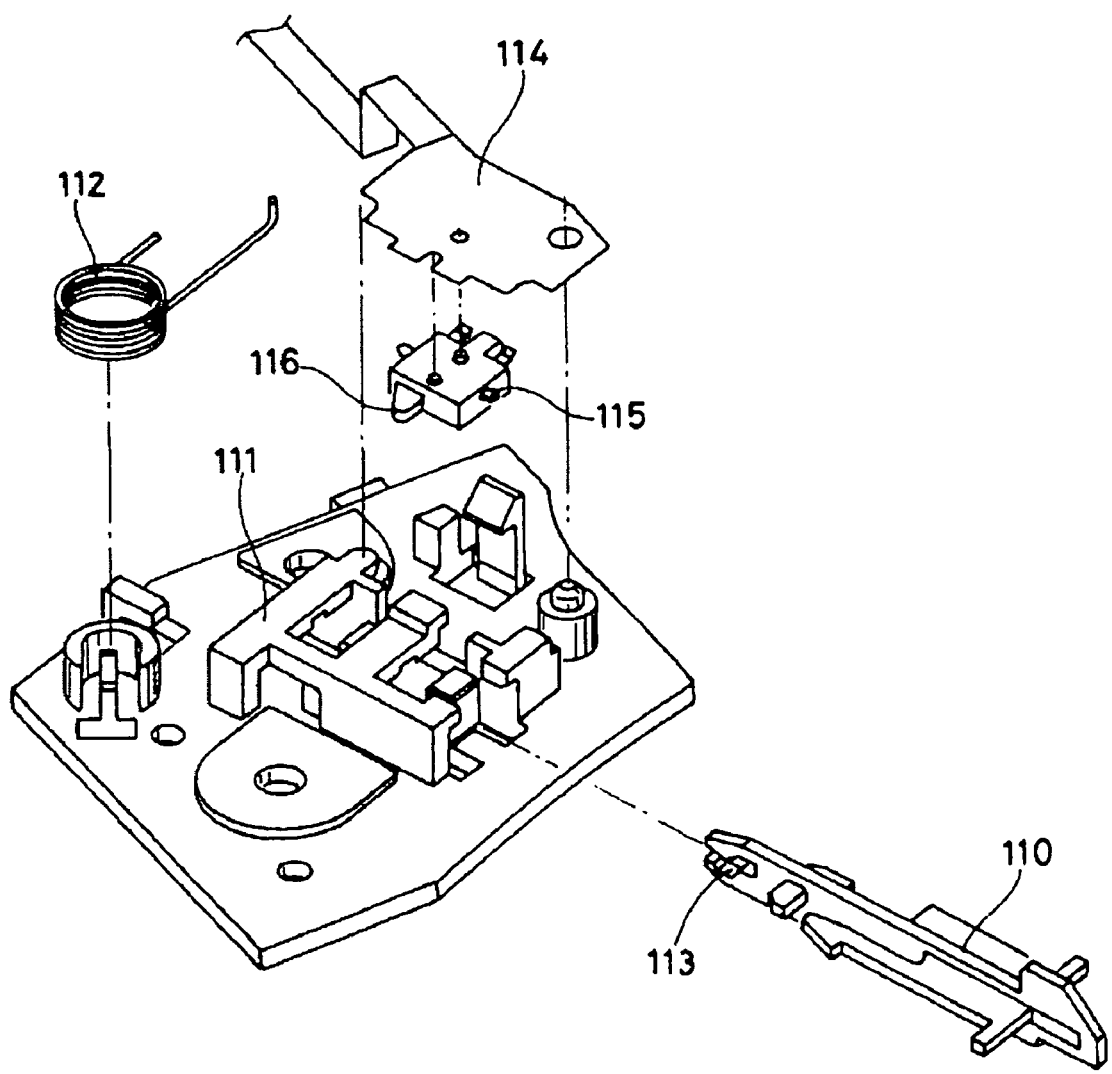
FIG. 35 is a partially enlarged and exploded perspective view of the detection mechanism for the disk-shaped recording medium.

The following describes the detection mechanism for a disk-shaped recording medium placed on the tray 13. As shown in FIGS. 34 and 35, a detection plate 110 is retractably provided against a vertical wall of the recessed section 14 in the tray 13. The detection plate 110 is slidably supported by a slide guide 111 outside the recessed section 14 in the tray 13 and is pressed toward the projection direction by a helical spring 112. That is to say, one end of the helical spring 112 engages with a cut 113 of the detection plate 110.

A circuit board 114 is provided on the side of the slide guide 111 on which a detection switch 115 is provided. The detection plate 110 presses an actuator 116 of the detection switch 115 to activate a detection operation.

Figure 36:
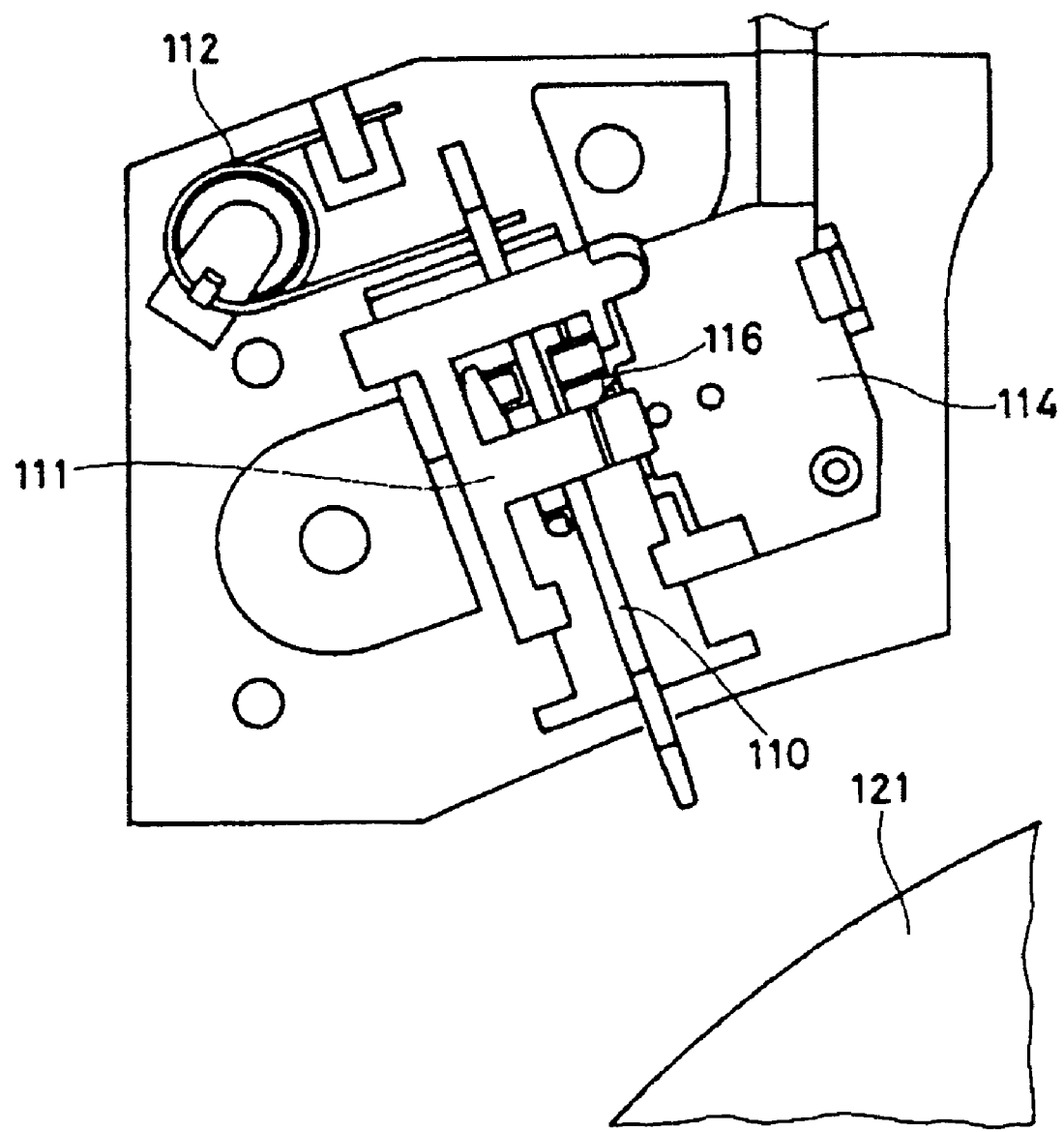
FIG. 36 is a partially enlarged plan view showing a detection operation for a bare disk.
Figure 37:
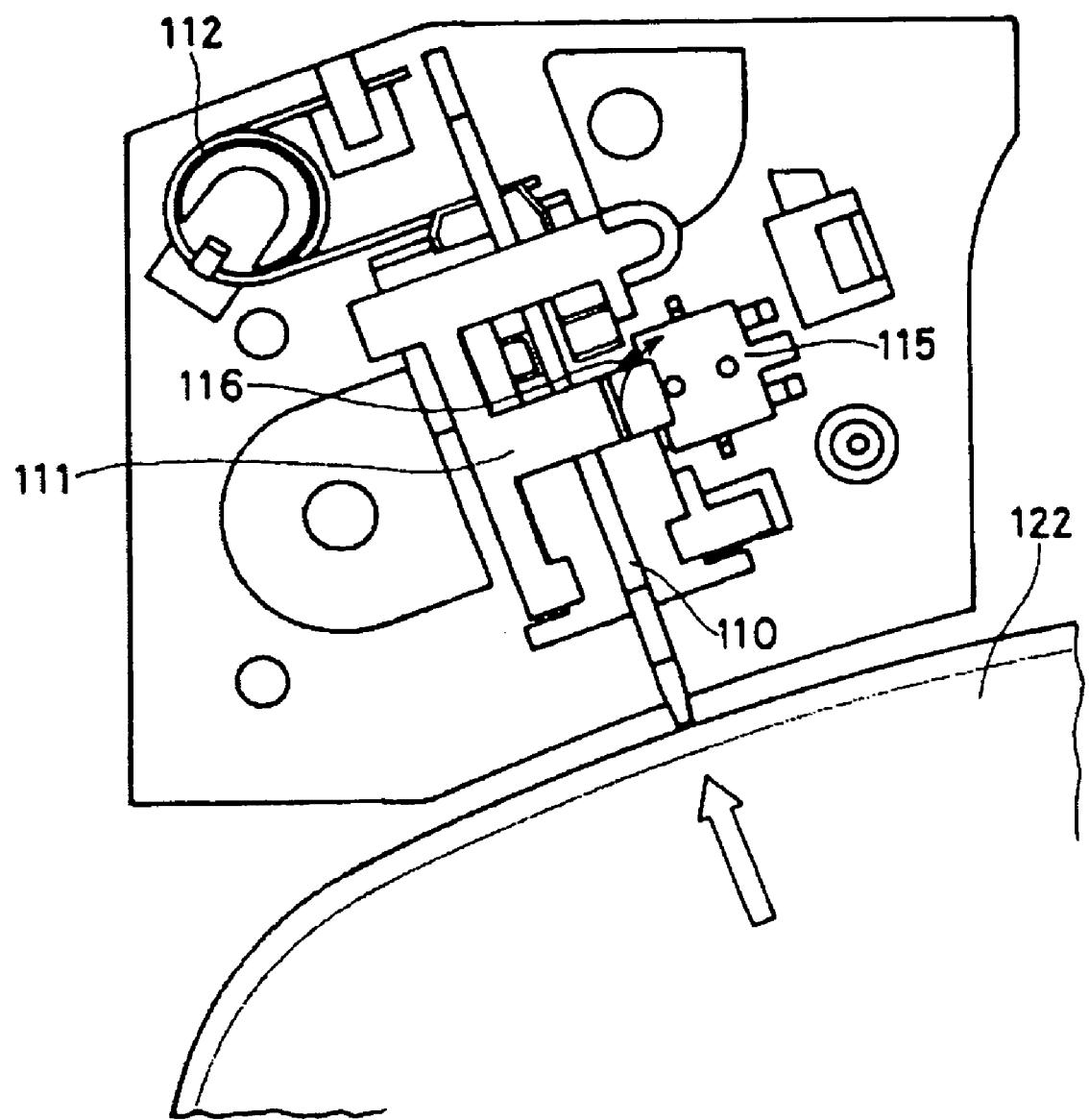
FIG. 37 is a partially enlarged plan view showing a detection operation for a DVR cartridge.

The detection plate 110 performs no detection operation when the bare disk 121 is mounted on the tray 13 as shown in FIG. 36. When a DVR cartridge 122 is mounted as shown in FIG. 37, a vertical wall section of the external chassis of the cartridge 122 presses the detection plate 110. The detection plate 110 slides to press the actuator 116 of the detection switch 115 for a changeover operation.

Figure 38:
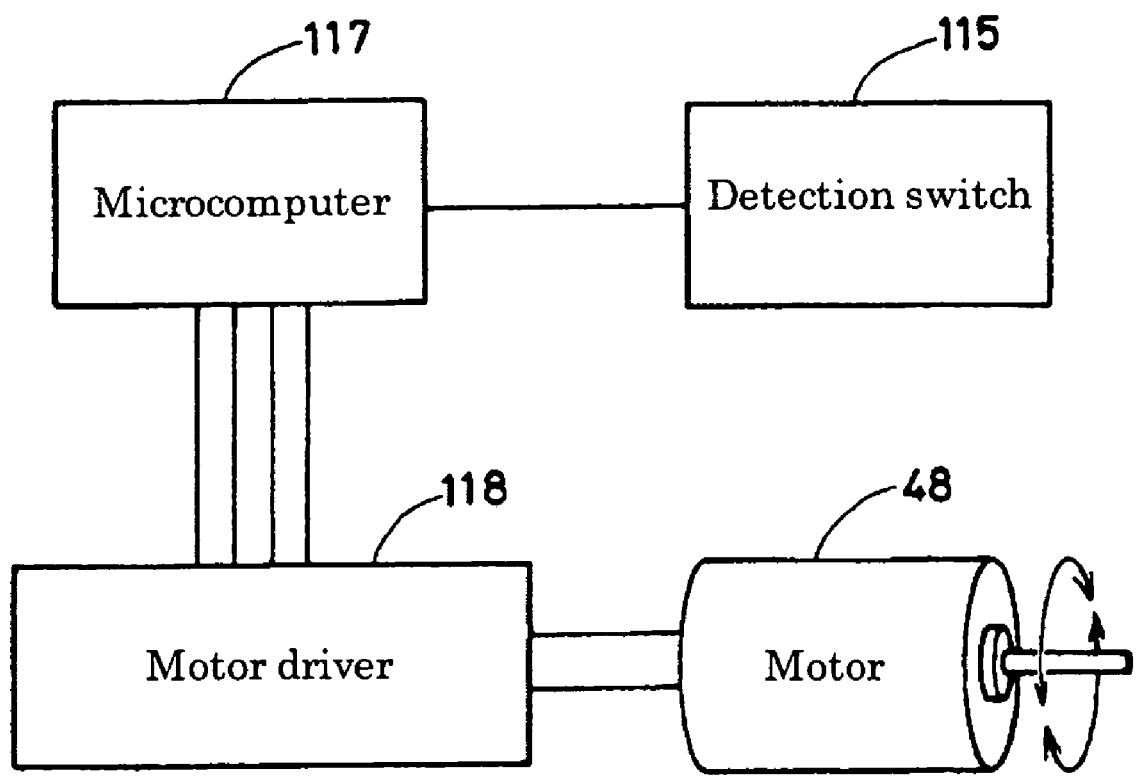
FIG. 38 is a block diagram showing a drive circuit of a motor for the tray drive section.
Figure 39:
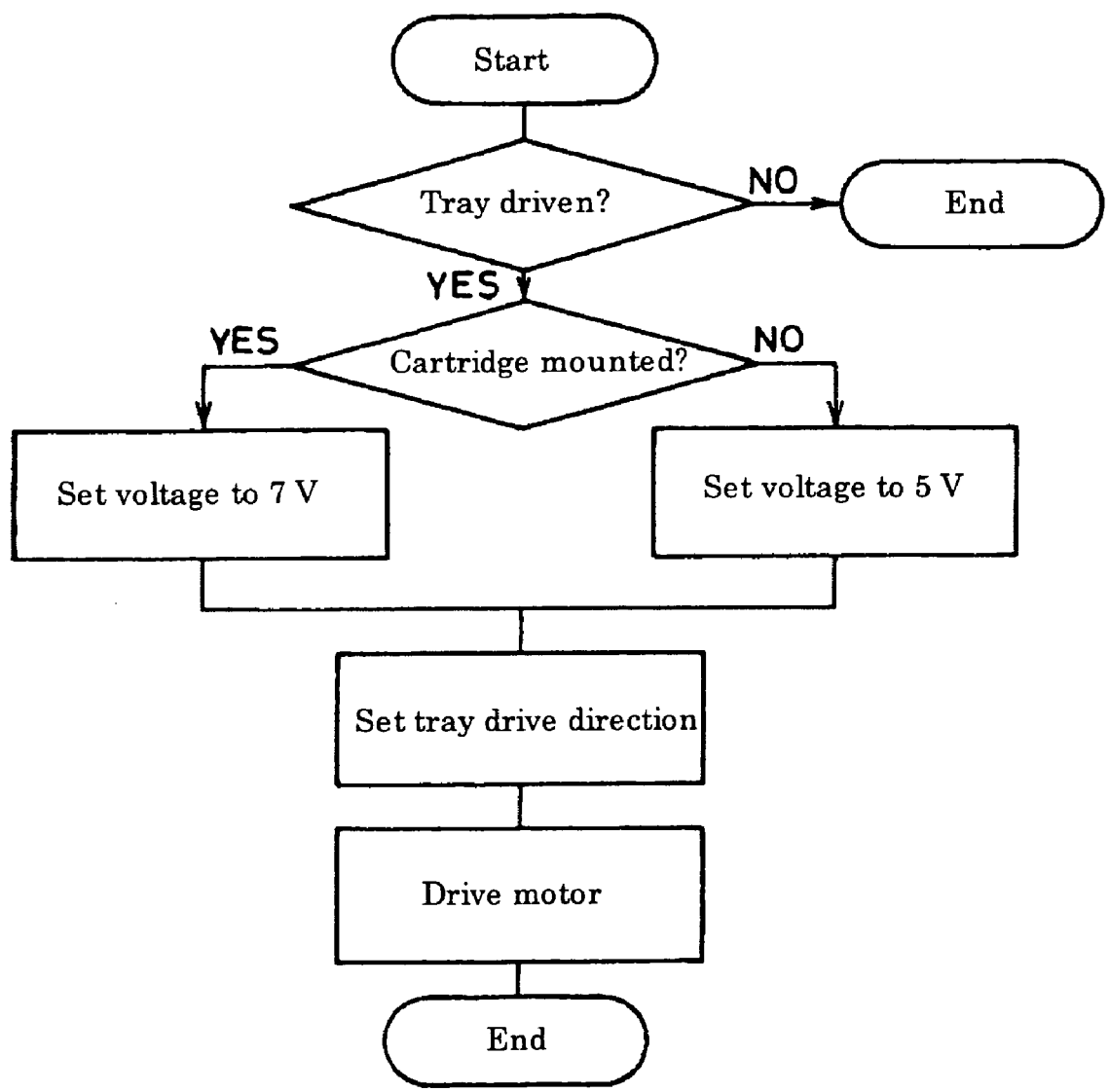
FIG. 39 is a flowchart showing an operation of changing a motor voltage.

The detection plate 110 activates a changeover operation of the detection switch 115 that is connected to a microcomputer 117 as shown in FIG. 38. The microcomputer 117 controls a motor driver 118 that is a drive circuit for the motor 48. FIG. 38 shows a drive system. FIG. 39 shows how the drive system is controlled. In this case, the drive system is configured to change a voltage for driving the motor 48 of the drive section 46 depending on whether a disk-shaped recording medium is the bare disk 121 or the DVR cartridge 122.

Support Structure of a Power Supply Flexible Printed Circuit Board 135

The following describes the support structure of the flexible printed circuit board for supplying power to the motor 48 of the drive section 46 for the tray 13. As mentioned above, the tray 13 has the drive section 46 thereon and moves between the recording-reproducing position and the ejecting position in a self-propelled manner. A flexible printed circuit board 135 supplies power from a power supply circuit board 136 to the motor 48 of the drive section 46 for such self-propelled operation (see FIGS. 44A and 44B and 45A through 45C).

Let us consider that the tray 13 moves to the ejecting position or is pulled from the external chassis 10 as shown in FIG. 2. Here, in the middle of the ejecting operation, the power supply flexible printed circuit board 135 for driving the motor 48 greatly hangs down in the middle of the long direction thereof. To prevent such slack, there is provided a guide mechanism comprising a flexible printed circuit board guide 125 and a guide rail 126.

Figure 40:
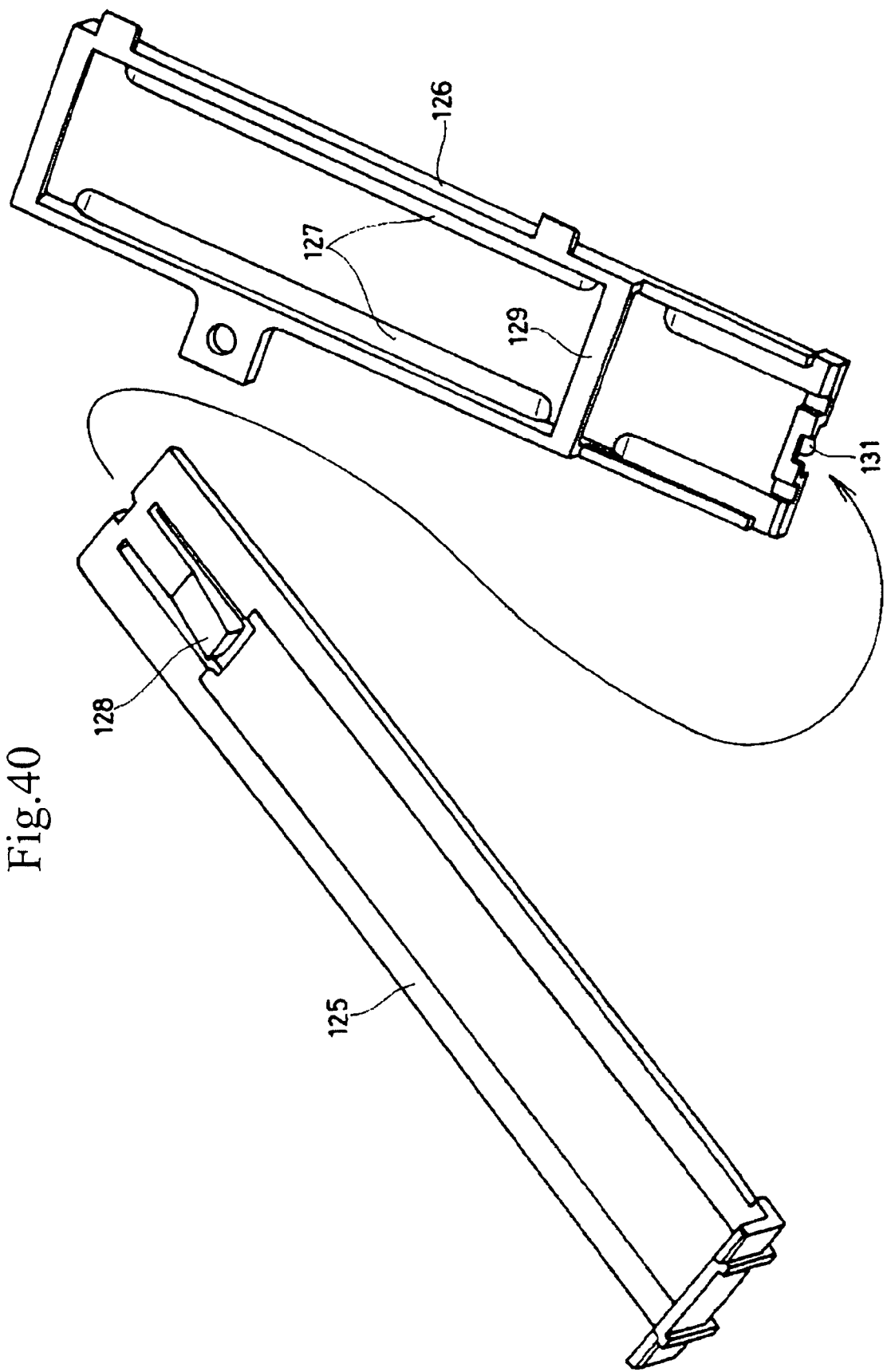
FIG. 40 is an exploded perspective view of a guide mechanism supporting a flexible printed circuit board.

As shown in FIG. 40, the flexible printed circuit board guide 125 is made of a long, narrow synthetic resin molding and is slidably supported by bearers 127 provided on both sides of the guide rail 126. The flexible printed circuit board guide 125 is provided with a nail 128. When the nail 128 crosses a cross bar 129 of the guide rail 126, the nail 128 elastically returns to the original position to prevent the flexible printed circuit board guide 125 from being disengaged from the guide rail 126. A helical extension spring 130 is provided between the flexible printed circuit board guide 125 and the guide rail 126 as shown in FIGS. 41A, 41B, 42A, and 42B. One end of the helical extension spring 130 is fixed to a hitching section 131 of the guide rail 126. The other end thereof is fixed to a hitching section 132 of the flexible printed circuit board guide 125. According to this structure, the flexible printed circuit board guide 125 is slidably supported in the guide rail 126. The helical extension spring 130 applies force to the flexible printed circuit board guide 125 in an extending direction away from the guide rail 126.

Figure 43:
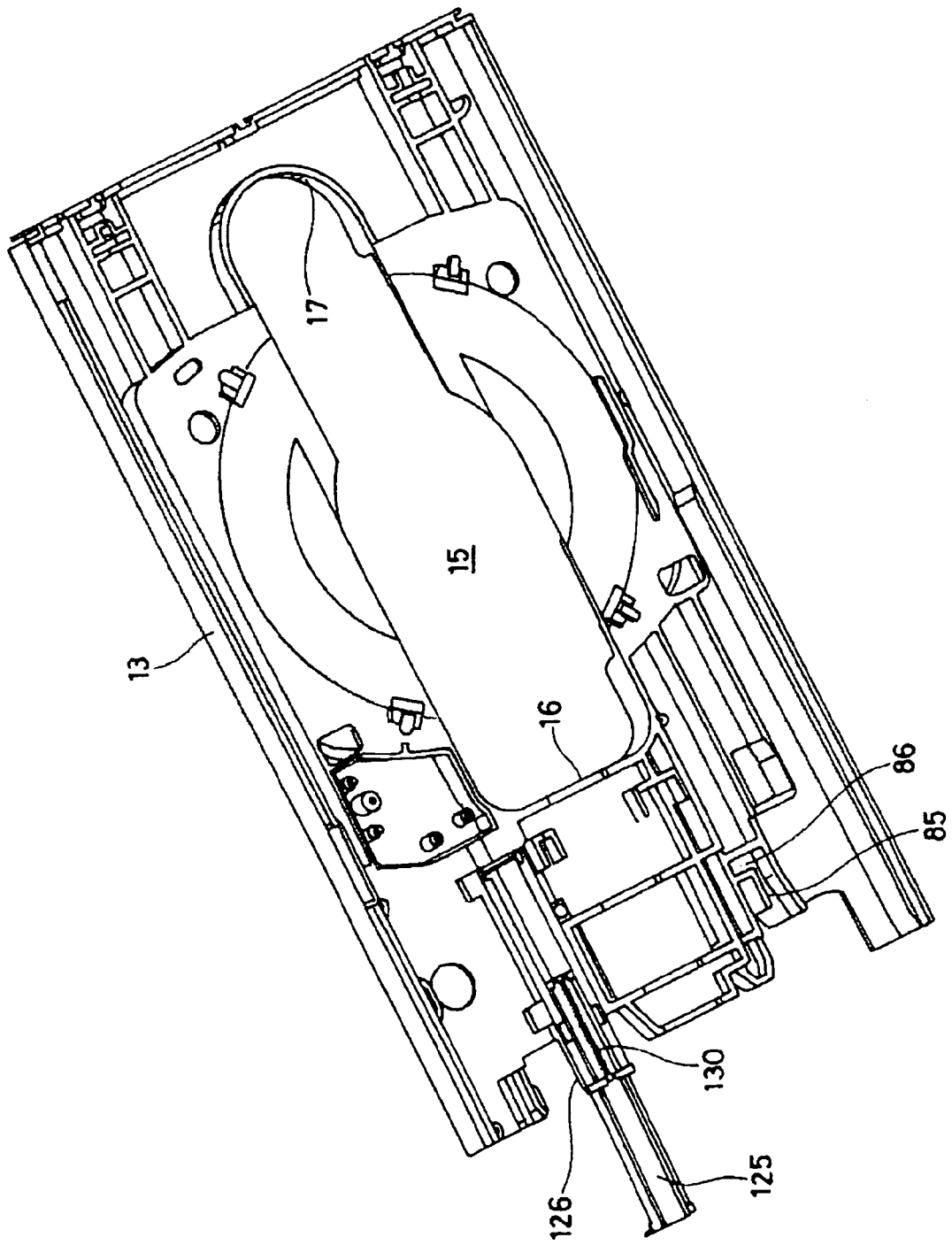
FIG. 43 is a perspective bottom view of the tray mounted with the printed circuit board guide mechanism.
Figure 44A:
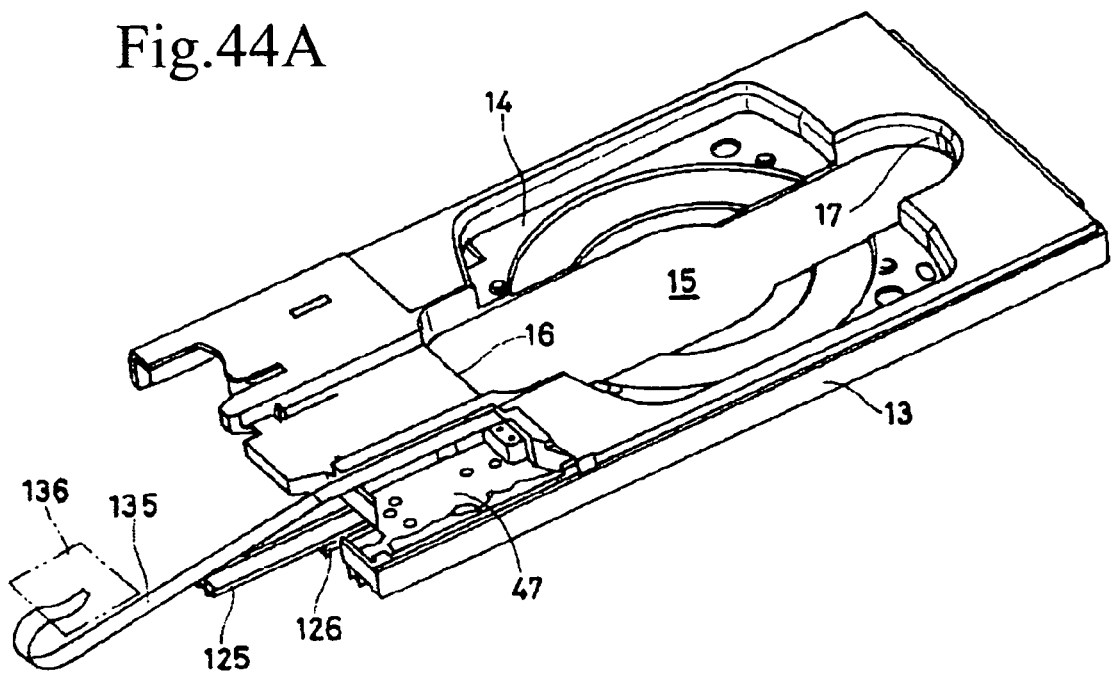
FIGS. 44A and 44B are partial perspective views of the printed circuit board guide mechanism with the tray ejected and retracted.
Figure 44B:
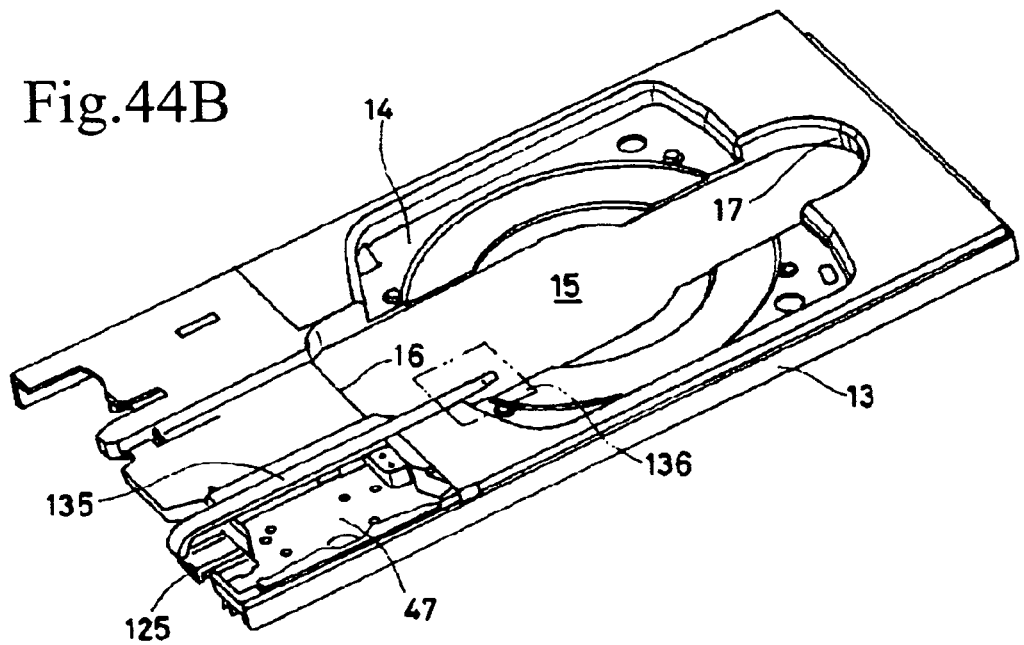

As shown in FIG. 43, the guide mechanism for the flexible printed circuit board 135 is located in the inner part of the tray 13 and is mounted and fixed to the bottom surface thereof. When the tray 13 ejects as shown in FIG. 44B, the flexible printed circuit board guide 125 extends to the rear to support the flexible printed circuit board 135 that is to hang down (see FIG. 45B).

(2) Operations and Effects

Overall Operations

The following describes overall operations of the disk recording-reproducing apparatus according to the above-mentioned configuration. As shown in FIG. 2, operating a switch (not shown) allows the drive section 46 to eject the self-propelled tray 13 from the horizontal aperture 12 in the front panel 11 of the external chassis 10. A bare disk or a DVR cartridge is placed in the recessed section 14 of the tray 13.

In this state, operating the switch (not shown) allows the motor 48 to drive the drive section 46 mounted on the tray 13, causing the pinion 56 and the rack 24 to retract the tray 13 in a self-propelled manner. As a result, the tray 13 is housed in the external chassis 10 as shown in FIG. 1.

An output from the drive section 46 of the tray 13 is used to move the chucking slider 20 in the direction of ejecting the tray 13, i.e., in the forward direction. The cam groove 23 of the chucking slider 20 is used to raise the base unit 30. Then, the turntable 43 on the base unit 30 rises to rotatively drive the bare disk or a disk in the cartridge. When the bare disk is mounted, the stepping motor 37 and the feed screw 36 in FIG. 5 are used to move the optical pickup 33 for DVD in the radial direction of the optical disk for recording and/or reproducing operations. When the DVR cartridge is mounted, the stepping motor 41 and the feed screw 40 are used to move the optical pickup 34 for DVR in the radial direction of the optical disk for recording or reproducing operations.

The base unit 30 rises to approach the tray 13. When the tray 13 moves the DVR cartridge 122 to the recording-reproducing position, the support pin 44 and the support arm 45 of the rising base unit 30 support the cartridge 122 as shown in FIGS. 7 through 9. As the base unit 30 rises, top ends of the support pin 44 and the support arm 45 extrude through the opening formed in the recessed section 14 of the tray 13. In this manner, the cartridge 122 is supported above the recessed section 14 of the tray 13. As shown in FIGS. 10 through 12, the bare disk 121 is supported at its center by the turntable 43 provided on the rising base unit 30 and is rotatively driven above the recessed section 14 of the tray 13.

There is provided the drive means that uses the common turntable 43 to move the optical pickups 33 and 34 for different formats such as DVD and DVR in the radial direction of disks. While one optical pickup accesses a recording medium compliant with the corresponding format, at least an objective lens, i.e., a head section of the other optical pickup escapes out of a projected area of the recording medium. This makes it possible to avoid conflicts among a plurality of types of optical pickups 33 and 34 and corresponding recording media. It becomes possible to decrease the number of parts, eliminate unnecessary spaces and mechanisms along the axis line of a disk, and provide a recording-reproducing apparatus with a reduced height.

After completion of a specified recording or reproducing operation, the drive section 46 of the tray 13 lowers the base unit 30. An output of the drive section 46 allows the tray 13 to be self-propelled to eject as shown in FIG. 2. Then, the bare disk or the cartridge can be removed from the recessed section 14 of the tray 13.

Self-propelled Operation of the Tray 13 Due to the Drive Section 46

The drive section 46 provided on the tray 13 has the changeover plate 62 as shown in FIGS. 13 and 15. The spring 65 applies a sliding force to the changeover plate 62 toward the right. That is to say, the contact section 66 comprising the bent portion extrudes. Accordingly, as shown in FIG. 15, the limiting section 71 of the coupling hole 70 restrains the forcing shaft 69 of the oscillating lever 67. In this case, the gears 54 and 55 engage with each other.

Consequently, rotation of the motor 48 is sequentially transmitted to the worm gear 49, the worm wheel gear 50, the gears 51, 52, 53, 54, and 55 to finally drive the pinion 56. The pinion 56 engages with the rack 24 of the chucking slider 20. In addition, the hook 82 of the lock lever 78 locks the chucking slider 20 (see FIG. 19). In this manner, the pinion 56 rolls on the rack 24 to enable a self-propelled operation of the tray 13 having the drive section 46 equipped with the pinion 56. The self-propelled operation of the tray 13 changes one state to the other as shown in FIGS. 1 and 2. The tray 13 can reciprocate between the ejecting position in FIG. 2 and the recording-reproducing position in FIG. 1.

The motor 48 and the drive section 46 are provided on the tray 13. The drive section 46 enables self-propelled operations of the tray 13. This structure eliminates the need for providing the tray 13 with a drive section at the side of the external chassis 10 or the base unit 30. The recording-reproducing apparatus according to the embodiment, in particular, arranges the optical pickup 33 for DVD to the front of the turntable 43 and the optical pickup 34 for DVR to the rear thereof as shown in FIG. 5. If the drive section for the tray 13 is further arranged to the front of the optical pickup 33 for DVD, the apparatus will have a very large depth, i.e., the dimension in the lateral direction in FIG. 5. If the drive section is arranged on the tray 13, by contrast, the drive section need not be arranged on the base unit 30 or the external chassis 10. Accordingly, it is possible to decrease the dimension along the movement direction of the tray 13 and miniaturize the entire apparatus.

Rising Operation of the Base Unit 30

An output from the drive section 46 provided on the tray 13 enables self-propelled operations of the tray 13. The tray 13 moves from the ejecting position to the recording-reproducing position. The tray 13 changes the state in FIG. 2 to that in FIG. 1 to retract into the external chassis 10. At this time, as shown in FIG. 19, the lock pin 81 of the lock lever 78, which is provided at the bottom rear of the exterior chassis 10, enters the L-shaped lock groove 85 provided at the rear of the tray 13, wherein the lock pin 81 is provided at the bottom rear of the tray 13. When the output from the drive section 46 retracts the tray 13 further toward the rear, the end of the L-shaped lock groove 85 in the tray 13 presses the lock pin 81 of the lock lever 78. As shown in FIG. 20, the lock lever 78 rotates clockwise around the support shaft 79 against the spring 80. The lock pin 81 enters the lock section 86 bent toward the side of the L-shaped lock groove 85. Subsequently, the lock section 86 of the L-shaped lock groove 85 restrains the lock pin 81 of the lock lever 78. In addition, the chucking slider 20 having the cam surface 89 moves to the left as indicated with an arrow in FIG. 21. The side surface of the cam surface 89 prevents the hook 82 of the lock lever 78 from rotating. As a result, the lock lever 78 locks the tray 13.

Since the lock lever 78 rotates clockwise around the support shaft 79, the hook 82 of the lock lever 78 disengages from the recessed section 87 of the chucking slider 20 as shown in FIG. 20. This unlocks the lock lever 78 of the chucking slider 20, enabling the chucking slider 20 to move in the movement direction of the tray 13.

Figure 28:
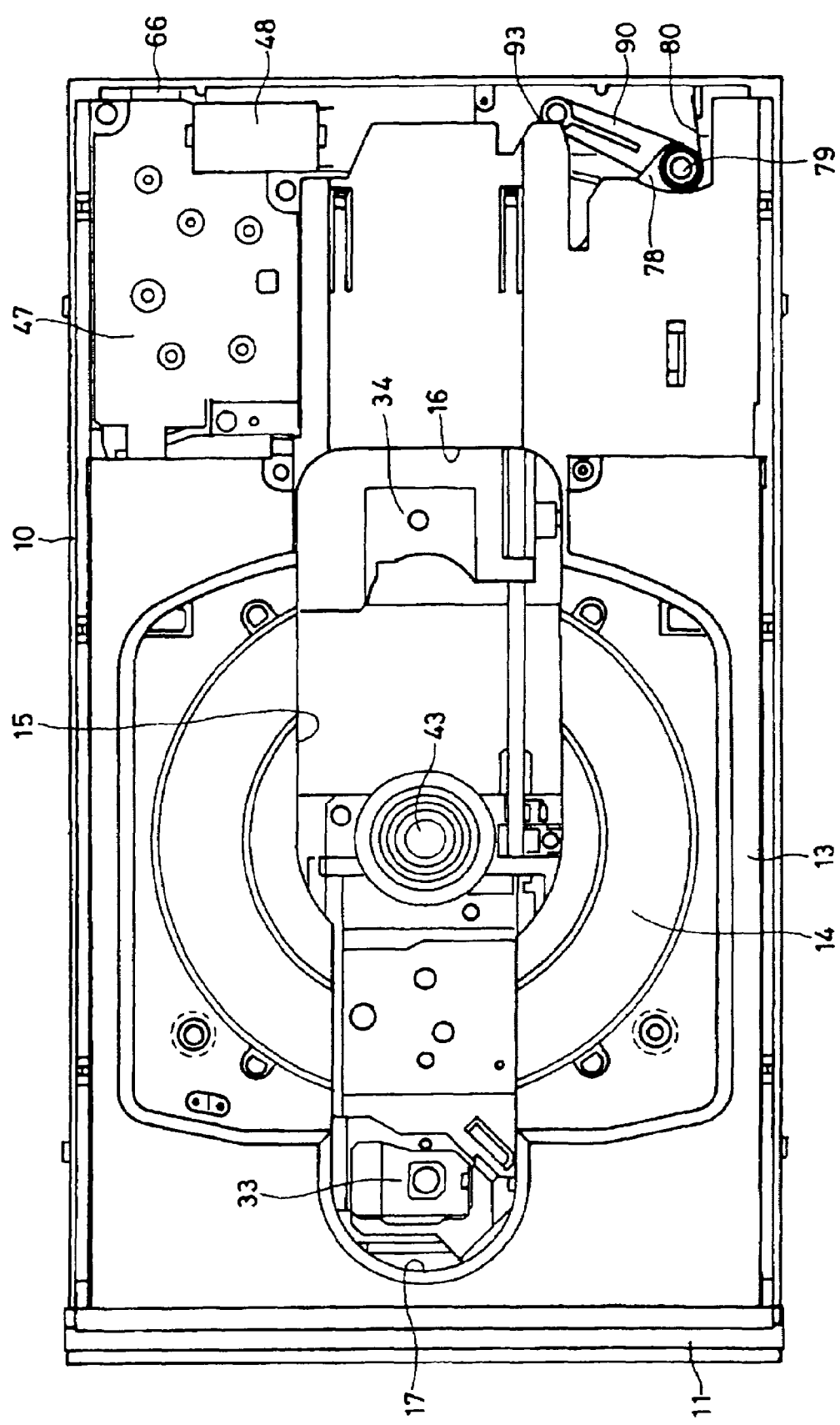
FIG. 28 is a plan view of the apparatus with the tray retracted to a recording-reproducing position.

When the drive section 46 retracts the tray 13 to the recording-reproducing position, the contact section 66 of the changeover plate 62 for the drive section 46 touches the rear panel of the external chassis 10 as shown in FIGS. 1 and 28.

The contact section 66 is then pressed to move the changeover plate 62 to the left against the spring 65 as shown in FIG. 14. The forcing shaft 69 disengages from the limiting section 71 for the coupling hole 70 of the changeover plate 62. At the same time, the forcing shaft 69 becomes free in the oscillating section 73, causing the oscillating lever 67 to oscillate. When the changeover plate 62 further moves to the left, the forcing shaft 69 is introduced into another limiting section 72 and is restrained here. The oscillating lever 67 is then switched. The gear 54 on the oscillating lever 67 disengages from the gear 55 and engages with the gear 57 as shown in FIG. 7.

Consequently, rotation of the motor 48 is sequentially transmitted to the worm gear 49, the worm wheel gear 50, the gears 51, 52, 53, 54, 57, 58, 59, and 55 to finally drive the pinion 56. At this time, the gear ratio increases in comparison with that for the gear engagement in FIG. 13. The pinion 56 decreases the rotational speed and increases the torque.

The drive section 46 performs the changeover operation in this manner. In addition, the pinion 56 of the drive section 46 generates high torque. This high drive torque presses the rack 24 of the chucking slider 20 with the unlocked hook 82 of the lock lever 78 toward the front, i.e., in the same direction as the ejection of the tray 13. When the chucking slider 20 is pressed slightly, the hook 82 of the lock lever 78 runs onto the cam surface 89 of the chucking slider 20, restraining the rotation of the lock lever 78. This reliably keeps the lock pin 81 of the lock lever 78 to be introduced into the lock section 86 for the L-shaped lock groove 85 of the tray 13.

Figure 24A:
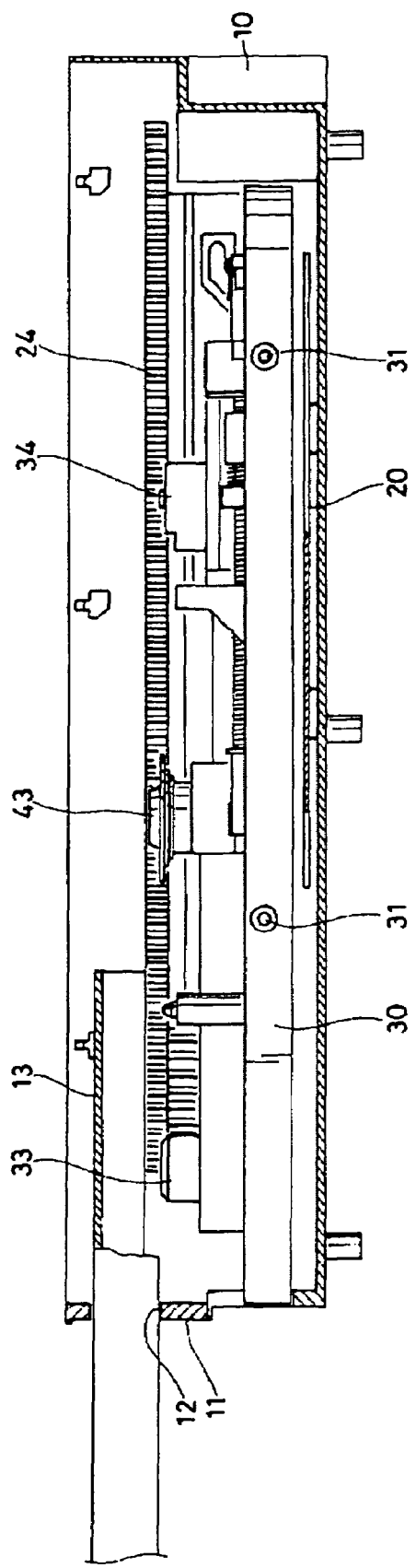
FIGS. 24A and 24B are partially vertical sectional views of the apparatus when the tray is retracting.
Figure 24B:
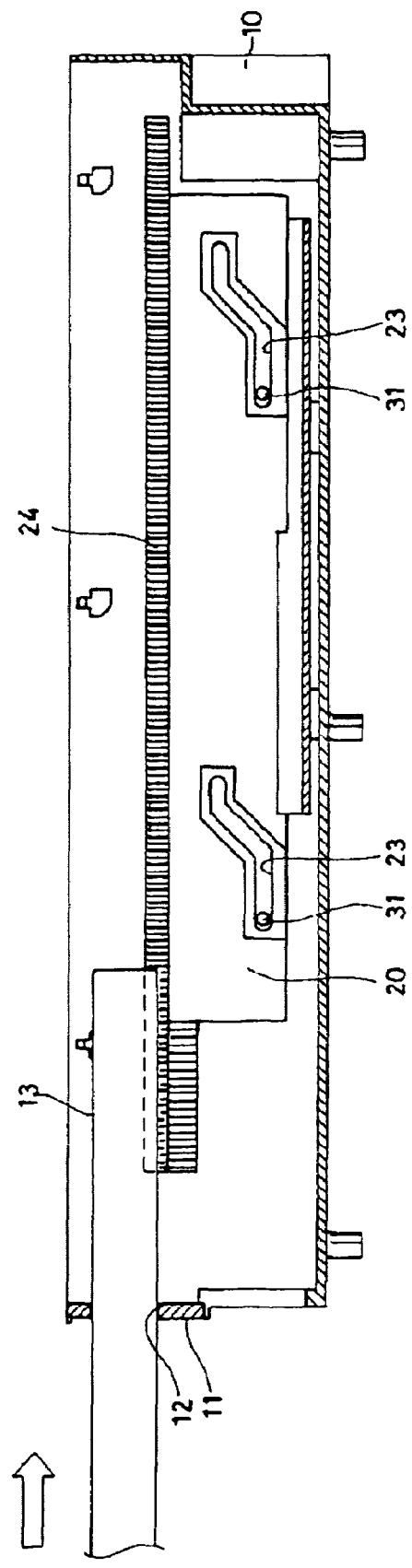

As shown in FIGS. 24A and 24B, the drive section 46 on the tray 13 retracts the tray 13 in a self-propelled manner. The tray 13 retracts to the recording-reproducing position as shown in FIGS. 24A and 25B. When the motor 48 continues to drive the drive section 46 for the tray 13, the drive section 46 is changed due to the movement of the changeover plate 62. The pinion 56 constituting an output end of the drive section 46 feeds the rack 24 of the chucking slider 20 to move the chucking slider 20 to the left as shown in FIGS. 26A and 26B.

The chucking slider 20 has the cam grooves 23 on both sides. The pin 31 of the base unit 30 engages in each of the cam grooves 23. The vertical slits 32 provided on both sides of the external chassis 10 restrict horizontal movement of the pins 31 at their tips. When the drive section 46 of the tray 13 drives to slide the chucking slider 20, the base unit 30 rises due to an effect of the cam grooves 23 via the pins 31.

When the base unit 30 rises, the optical pickup 33 for DVD and the optical pickup 34 for DVR mounted thereon respectively enter the semicircular cut 17 and the U-shaped cut 16 of the aperture 15 in the tray 13. Further, the turntable 43 on the base unit 30 enters the aperture 15 to support an optical disk transported by the tray 13. Accordingly, the optical disk rotates above the tray 13, as if floating there above. The optical pickup 33 for DVD or the optical pickup 34 for DVR accesses the optical disk for recording or reproducing operations.

Figure 27:
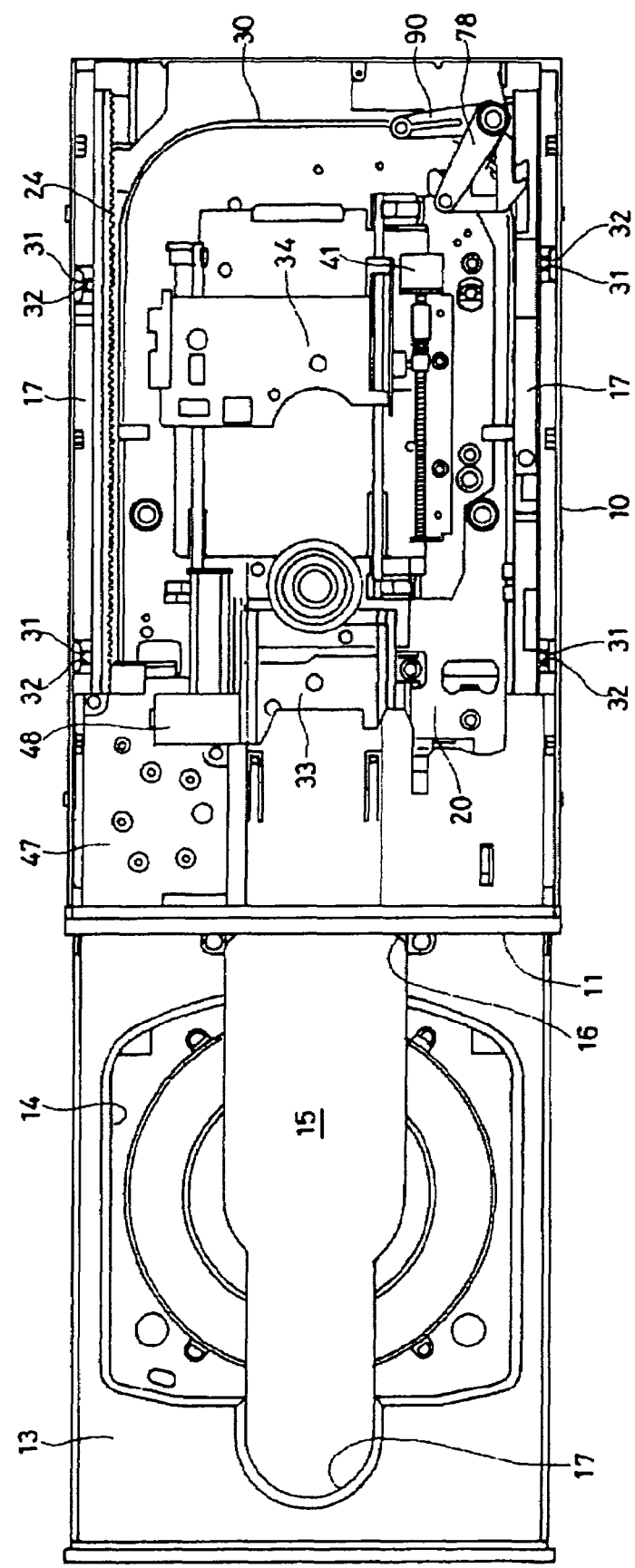
FIG. 27 is a plan view showing that the tray is ejected.

FIG. 27 shows that the tray 13 is ejected. A bare disk or a DVR cartridge is mounted on the recessed section 14 in the tray 13. When the tray 13 retracts with this state, the tray 13 moves to the recording-reproducing position as shown in FIG. 28.

Falling Operation of the Base Unit 30

FIGS. 26A and 26B show the relationship between the base unit 30 and the tray 13 during a recording or reproducing operation on the bare disk or the DVD cartridge.

Upon completion of the recording or reproducing operation, the motor 48 of the drive section 46 on the tray 13 is driven reversely, i.e., in the direction of ejecting the tray 13. At this time, the contact section 66 of the changeover plate 62 for the drive section 46 touches the rear panel of the external chassis 10. Therefore, the gears in the drive section 46 engage with each other as shown in FIG. 14.

When the motor 48 is driven in this state, the pinion 56 moves the rack 24 to the rear with a high drive torque, i.e., to the right in FIGS. 26A and 26B. As shown in FIGS. 25A and 25B, the chucking slider 20 accordingly moves to the right together with the cam grooves 23 provided thereon that catch the pins 31 on both sides of the base unit 30. The pins 31 on the base unit 30 are lowered along the vertical slits 32. Consequently, the pair of optical pickups 33 and 34 on the base unit 30 are lowered from the cuts 17 and 16 at both sides of the aperture 15 in the tray 13, respectively. As the base unit 30 lowers, the turntable 43 lowers to seat the bare disk or the cartridge on the recessed section 14 of the tray 13.

According to the movement of the chucking slider 20, the hook 82 of the lock lever 78 in FIG. 21 slides on the cam surface 89 to become the state in FIG. 20. Then, the hook 82 rotates counterclockwise around the support shaft 79 due to a force from the helical spring 80 and falls into the recessed section 87 as shown in FIG. 19.

When the lock lever 78 rotates counterclockwise around the support shaft 79, the lock pin 81 on the lock lever 78 disengages from the lock section 86 of the L-shaped lock groove 85 on the tray 13 to unlock the tray 13. The rotation of the lock lever 78 allows the hook 82 to fall into the recessed section 87 of the chucking slider 20. This locks the chucking slider 20 that becomes the state in FIG. 19.

The motor 48 of the drive section 46 of the tray 13 continues to rotate thereafter. The pinion 56 of the drive section 46 rolls on the rack 24 of the locked chucking slider 20 to move the tray 13 to the ejecting position. At an initial stage of this movement, the changeover plate 62 of the drive section 46 leaves the rear panel of the external chassis 10. Accordingly, the changeover plate 62 moves to the right due to the spring 65. The drive section 46 changes the state in FIG. 14 to that in FIG. 13. The ejection operation takes place at a relatively high speed. When the tray ejects completely, the bare disk or the DVR cartridge can be removed from the recessed section 14 of the tray 13.

Effects of the Elevation Mechanism for the Base Unit 30

The disk recording-reproducing apparatus according to the embodiment of the present invention has two optical pickups corresponding to different disk formats at the front and the rear of the turntable 43 constituting a disk rotating section. The apparatus has the structure capable of loading operations compatible with DVR-only cartridges and DVD/CD bare disks.

According to the structure of the base unit 30, there are provided the DVR optical pickup 34 (laser wavelength of 405 nm) for reading and writing data on DVR cartridges and the DVD optical pickup 33 (laser wavelength of 650/780 nm, with a 2-wavelength lens) for recording and reproducing data on DVD/CD disks. These optical pickups are arranged before and after the base unit 30. The chucking slider 20 is slidably arranged on the bottom plate of the external chassis 10. There is provided a pair of cam grooves 23 for vertically moving up and down the chucking slider 20 through the two protruding pins 31 on each of both sides of the base unit 30. Further, the chucking slider 20 has the rack 24 that engages with the pinion 56 of the drive section 46 for the tray 13.

The tray 13 has the recessed section 14 and the aperture 15. The recessed section 14 is capable of mounting a DVR cartridge or a DVD/CD bare disk. The aperture 15 continuously forms the cuts 17 and 16 for accepting two optical pickups 33 and 34 arranged before and after the turntable 43. The tray 13 has the pinion 56 that decelerates rotation of the motor 48 by means of a set of gears and transmits power to the rack 24. The drive section 46 is mounted on the tray 13 at its rear.

The hook lever 78 provided on the bottom plate of the external chassis 10 comprises the hook 82 for locking the chucking slider 20 and the lock pin 81 entering the lock section 86 of the lock groove 85 for the tray 13. The support shaft 79 provided with the lock lever 78 is planted on the external chassis that constitutes a guide member for sliding the chucking slider 20 and the tray 13.

When the lock lever 78 locks the chucking slider 20 as shown in FIG. 19, the cam groove 23 of the chucking slider 20 allows the base unit 30 to lower as shown in FIGS. 24A and 24B. The tray 13 ejects and retracts by means of rotation of the motor 48 in the drive section 46 for the tray 13.

Immediately before the tray 13 completely retracts as shown in FIG. 2, the lock pin 81 of the lock lever 78 enters the L-shaped lock groove 85 in the tray 13 as shown in FIG. 19. When the tray 13 retracts further, the lock pin 81 of the lock lever 78 is introduced into the lock section 86 of the L-shaped lock groove 85. At the same time as shown in FIG. 20, the hook 82 of the lock lever 78 disengages from the recessed section 87 of the chucking slider 20 to unlock the chucking slider 20.

The tray 13 completely retracts to allow the contact section 66 of the changeover plate 62 for the drive section 46 to touch the external chassis 10. Then, the drive section 46 changes the state in FIG. 13 to that in FIG. 14. In addition, rotation of the motor 48 for the drive section 46 becomes a driving force for the chucking slider 20. At this time, the hook 82 of the lock lever 78 slides on the cam surface 89 of the chucking slider 20 that slides as shown in FIG. 21. Consequently, the lock lever 78 cannot rotate counterclockwise even if it is applied with a force from the helical spring 80. The tray 13 is fixed to that position with the lock pin 81 of the lock lever 78 inserted into the lock section 86. The driving force of the drive section 46 reversely presses the chucking slider 20 in the ejection direction to elevate the base unit 30.

Accordingly, this configuration can miniaturize the drive apparatus for the tray 13 by providing the tray drive section 46 on the tray 13 at its rear end in the apparatus that arranges a pair of optical pickups 33 and 34 before and after the turntable 43. Since the lock lever 78 is used to lock and unlock the chucking slider 20 and the tray 13, the motor 48 of the drive section 46 provided on the tray 13 can exclusively move the tray 13 and elevate the base unit 30. This makes it possible to decrease the number of drive sections and parts and save the costs.

Emergency Rejection of the Tray 13

The following describes an emergency ejection apparatus for the tray 13 provided in the recording-reproducing apparatus. As mentioned above, the tray 13 is driven by the drive section 46 mounted thereon for self-propelled operations and can reciprocate between the recording-reproducing position and the ejecting position. When the tray 13 is located to the recording-reproducing position with a bare disk or a DVD cartridge mounted, however, the motor 48 or the drive section 46 may not function, disabling the tray 13 from being ejected. In this case, the emergency ejection of the tray 13 is made available by inserting a screwdriver into the circular hole 99 on the bottom plate 98 of the external chassis 10 to rotate the emergency ejecting pinion 100. This operation is described below.

As shown in FIGS. 32 and 33, the emergency ejecting pinion 100 is rotatively supported by the support shaft 102 of the bracket 101. In addition, the helical compression spring 103 presses the step section 104. Accordingly, the emergency ejecting pinion 100 is pressed against the bottom plate 103 so that the recessed section 105 covers the sleeve 106. The sleeve 106 communicating with the circular hole 99 is located within the recessed section 105 of the pinion 100. The helical compression spring 103 presses the pinion 100 downward to provide a sealed structure, preventing dust from entering the external chassis 10 through circular hole 99.

Figure 31:
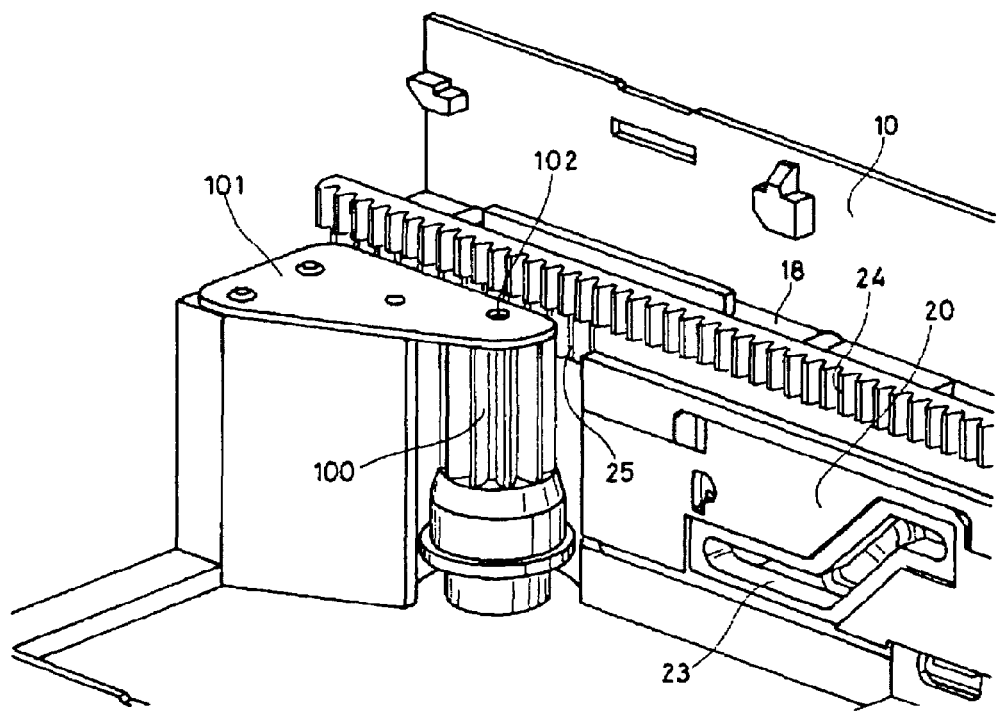
FIG. 31 is a perspective view with the emergency ejecting pinion raised.

When a screwdriver is inserted into the circular hole 99 on the bottom surface 98 in this state and is pushed upward, the screwdriver presses the helical compression spring 103 as shown in FIGS. 31 and 33. Simultaneously, the pinion 100 slides upward through the support shaft 102. At this time, the recessed section 105 of the pinion 100 engages with an external surface of the sleeve 106. The external surface thereof works as a guide surface.

When the pinion 100 moves upward in this manner, it engages with the emergency ejecting rack 25 provided under the rack 24 of the chucking slider 20 as shown in FIGS. 31 and 33. At this time, the hook 82 of the lock lever 78 is positioned on the cam surface 89 of the chucking slider 20 as shown in FIG. 21. The lock lever 78 does not lock the chucking slider 20. When the emergency ejecting pinion 100 is rotated counterclockwise as indicated with an arrow in FIG. 22, the chucking slider 20 moves to the inner part of the external chassis 10. That is to say, the chucking slider 20 moves from the position in FIG. 26B to that in FIG. 25B. The cam groove 23 of the chucking slider 20 supports the pins 31 provided on both sides of the base unit 30 that then moves down along the vertical slit 32. Accordingly, a pair of pickups 33 and 34 and the turntable 43 on the base unit 30 disengages downward from the aperture 15 of the tray 13.

In accordance with the movement of the chucking slider 20 and the subsequent movement of the tray 13, the hook 82 of the lock lever 78 drops into the recessed section 87 of the chucking slider 20 due to an elastic restoring force of the helical spring 80 as shown in FIG. 19. The lock lever 78 rotates counterclockwise around the support shaft 79 as shown in FIG. 19. Consequently, the lock section 86 of the lock lever 78 disengages from the lock section 86 of the L-shaped lock groove 85 on the tray 13. The lock lever 78 is unlocked for the tray 13.

In this state, when the emergency ejecting pinion 100 is further rotated with the screwdriver, the emergency ejecting rack 25 pushes the chucking slider 20 as shown in FIG. 22. The step section 92 provided on the chucking slider 20 then pushes the pressed section 91 of the retracting lever 90 as shown in FIG. 23. The retracting lever 90 is rotated counterclockwise around the support shaft 79 as shown in FIG. 23. The tip of the retracting lever 90 then presses the contact section 93 at the rear of the tray 13, pushing back the tray 13 for a specified amount. As will be clearly understood from the comparison between FIGS. 22 and 23, this pushback amount is equivalent to a length of the tray 13 at its end protruding from the horizontal aperture 12 of the front panel 11.

In this manner, the end of the tray 13 is pushed out of the horizontal aperture 12 for a specified amount. By holding and pulling the ejected part of the tray 13, a user can completely take out the tray 13 that malfunctioned. The drive section 46 functions as an adjuster to slow down the movement of the tray while it is pulled out.

Even if the drive section 46 or the motor 48 of the tray 13 does not function, such emergency ejection operation for the tray 13 allows a user to pull out the tray 13 and take out the bare disk or the cartridge from the tray 13. Further, as shown in FIG. 32, the pinion 100 for emergency ejection allows its recessed section 105 to let in the sleeve 106 provided so as to cover the circular hole 99. The helical compression spring 103 is used to press the pinion 100 downward. According to this structure, the bottom end of the emergency ejecting pinion 100 tightly contacts with the bottom surface 98 of the external chassis 10 to provide a dust-proof structure. Therefore, this prevents dust from entering the external chassis 10 through the circular hole 99.

Disk Loading Corresponding to Detection of Media

As shown in FIGS. 34 and 35, the disk recording-reproducing apparatus is provided with the detection plate 110 so as to face part of the vertical wall at the outside periphery of the recessed section 14 for the tray 13. The detection plate 110 is used to determine a disk-shaped recording medium mounted on the recessed section 14 for the tray 13.

When the bare disk 121 is mounted on the tray 13 as shown in FIG. 36, the detection plate 110 cannot detect the bare disk 121. The detection plate 110 remains pushed by the helical spring 112. In this case, the detection switch 115 remains unchanged. When the DVR cartridge 122 is mounted on the tray 13, by contrast, the side wall section at the outside periphery of the cartridge 122 pushes the detection plate 110 as shown in FIG. 37. The detection plate 110 is retracted against the helical spring 112. In response to this slide operation, the detection plate 110 presses the actuator 116 of the detection switch 115 to change the state of the detection switch 115.

The detection plate 110 is used to determine media by detecting the bare disk 121 or the DVR cartridge 122. According to this media determination, the microcomputer 117 in FIG. 38 changes a voltage applied to the motor 48 based on the flowchart in FIG. 39. When the bare disk 121 is detected, a drive voltage for the motor 48 is set to 5 V. When the DVR cartridge 122 is detected, a drive voltage for the motor 48 is set to 7 V.

Loads for self-propelling the tray 13 vary with weights of media placed on the tray 13, a load for opening a shutter of the DVR cartridge 122, and a load for a bare disk chucking mechanism (not shown). Accordingly, it becomes possible to drive the motor 48 with optimal drive voltages corresponding to these loads and stably move the tray 13 despite changes in weights of different-types of media.

Guide Operation for the Flexible Printed Circuit Board 135

As mentioned above, the tray 13 mounts on itself the drive section 46 and the motor 48 for self-propelled operations. Hence, it is necessary to supply power to the motor 48 of the drive section 46 from the outside. The power supply flexible printed circuit board 135 as shown in FIGS. 44A and 44B is used for this purpose. One end of the flexible printed circuit board 135 is connected to the fixed power supply circuit board 136. The flexible printed circuit board 135 supplies power from the fixed power supply circuit board 136. When the tray 13 is pulled out of the horizontal aperture 12 of the front panel 11, the flexible printed circuit board 135 largely slacks downward in the middle of an operation to pull out the tray 13 as shown in FIG. 45B. There is provided a support mechanism for the flexible printed circuit board 135 as shown in FIG. 45A comprising the flexible printed circuit board guide 125 and the guide rail 126 to prevent the flexible printed circuit board 135 from slacking.

Figure 41A:
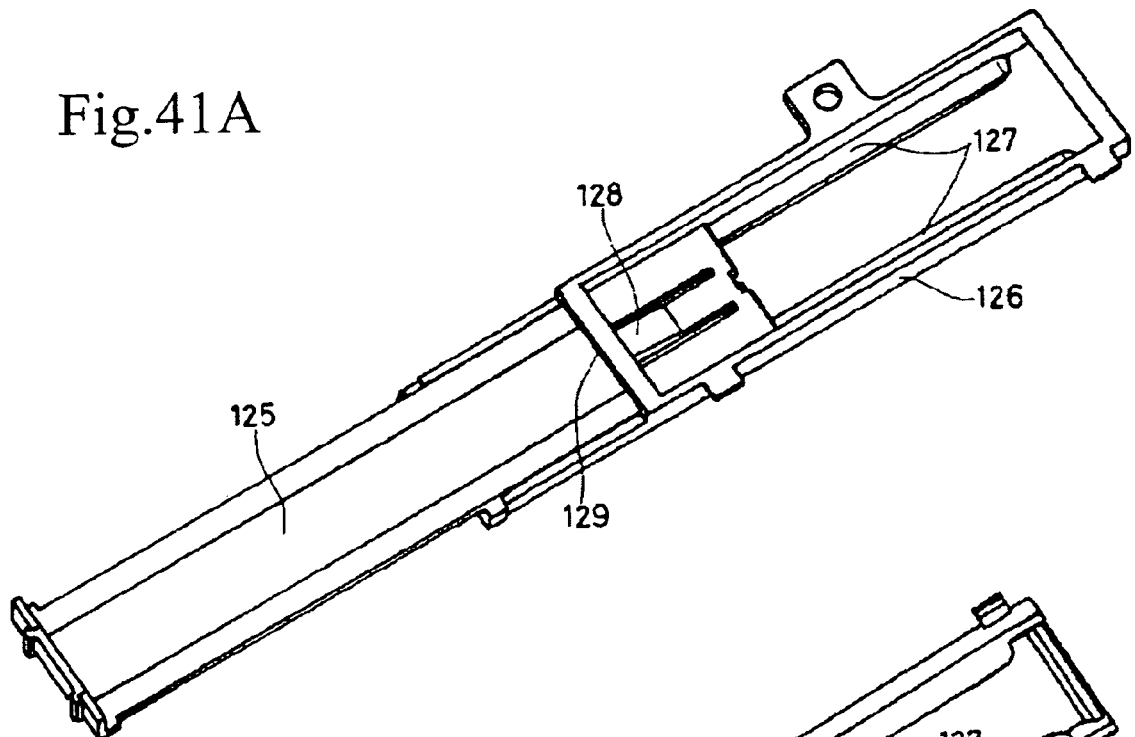
FIGS. 41A and 41B are perspective views showing the guide mechanism assembled in an expanded position.
Figure 41B:
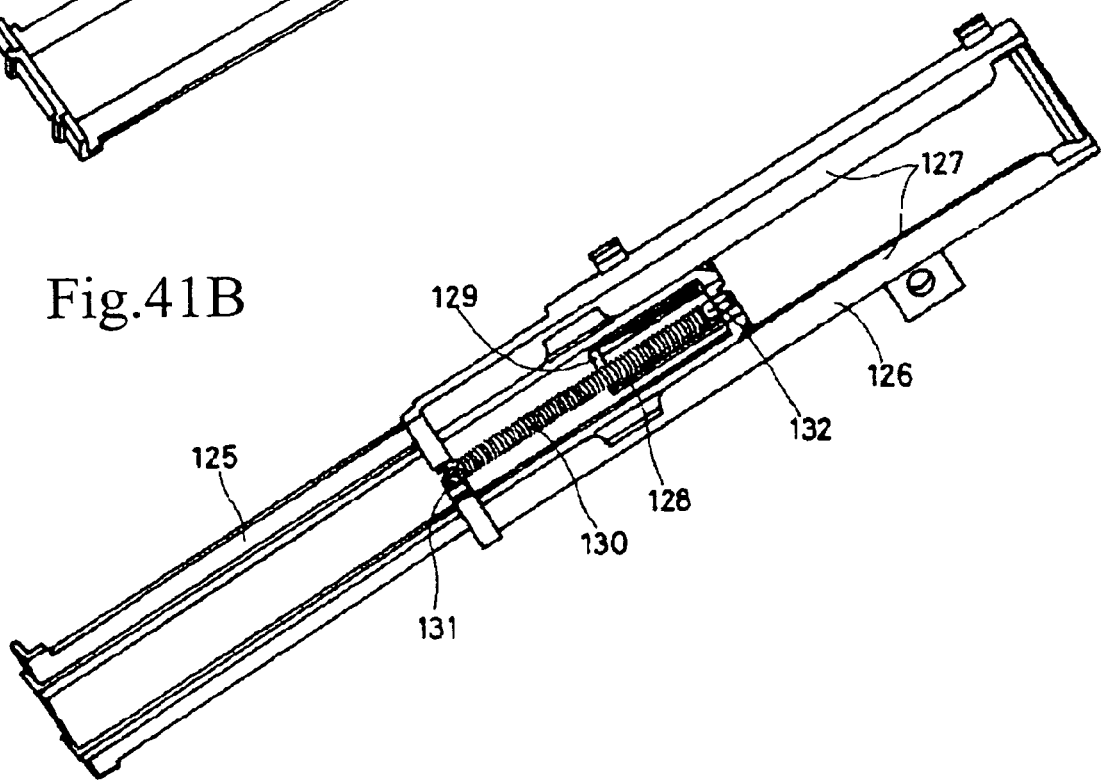

When the tray 13 is pulled out as shown in FIG. 44A, the support mechanism functions as follows. The helical extension spring 130 applies force for pulling out the flexible printed circuit board guide 125 from the guide rail 126 to support the flexible printed circuit board 135, as shown in FIGS. 41A and 41B. This operation occurs when the tray 13 moves between the ejecting position and the recording-reproducing position.

Figure 42A:
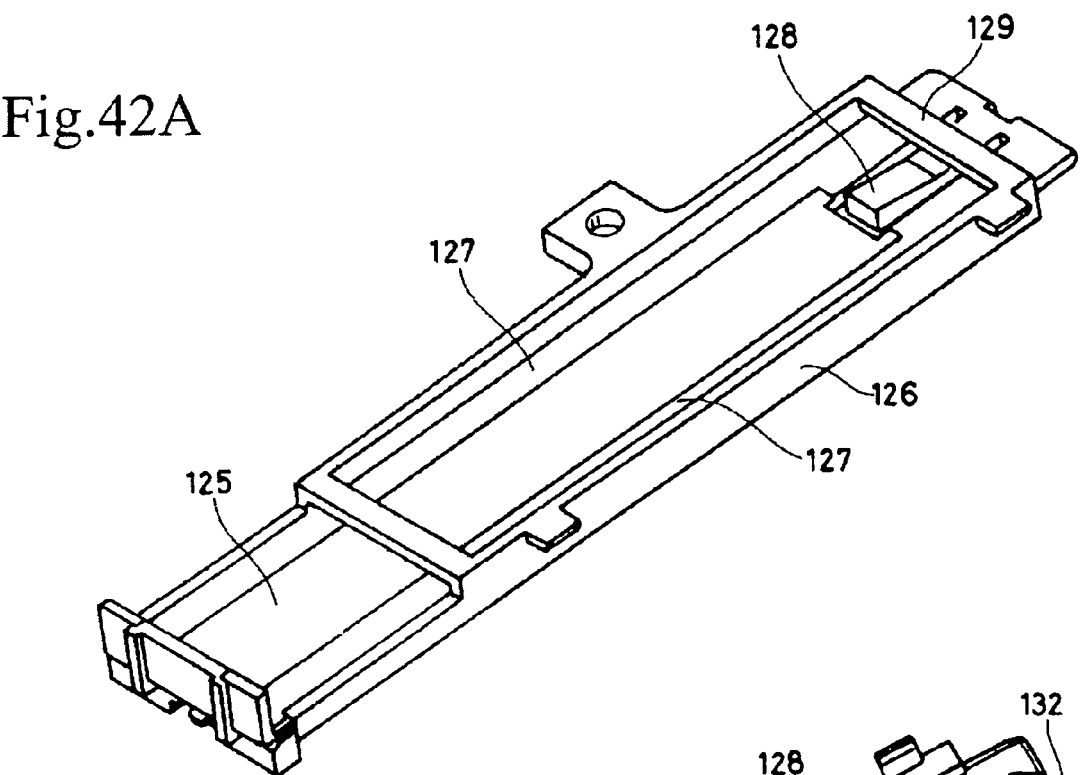
FIGS. 42A and 42B are perspective views showing the guide mechanism assembled in a retracted position.
Figure 42B:
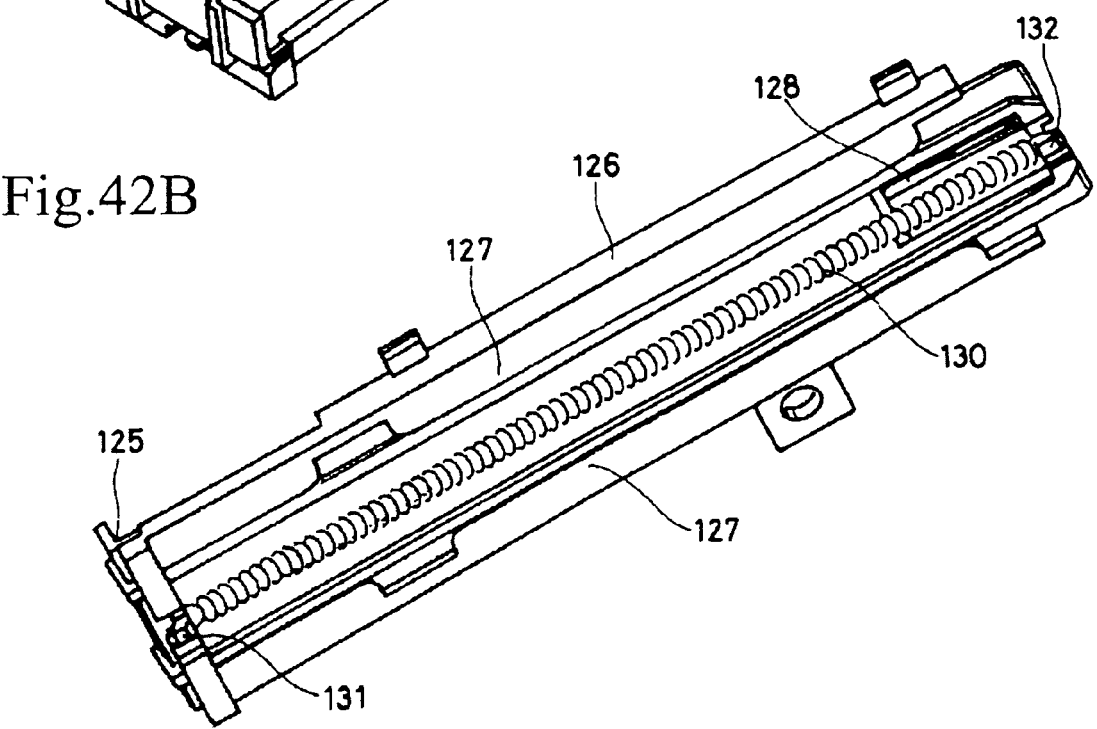

In FIG. 44B, the tray 13 almost completely retracts into the chassis 10 and moves to the recording-reproducing position. At this time, the flexible printed circuit board guide 125 touches a plate at the rear of the external chassis 10. The flexible printed circuit board guide 125 is pulled into the guide rail 126 as shown in FIGS. 42A and 42B. In this case, the guide mechanism comprising the flexible printed circuit board guide 125 and the guide rail 126 is maintained to almost the same height as the rear end of the tray 13.

This structure provides a guide member for the flexible printed circuit board 135 comprising the flexible printed circuit board guide 125 and the guide rail 126 under the tray 13. This makes it possible to effectively support the power supply flexible printed circuit board 135 from underneath in a limited space. Since the helical extension spring 130 is used for sliding the flexible printed circuit board guide 125, this guide can be extended to support the power supply flexible printed circuit board 135 or be compactly contracted otherwise. In addition, the guide rail 126 supports the flexible printed circuit board guide 125 with its nail 128 crossing over the cross bar 129. The flexible printed circuit board guide 125 can be very easily assembled to the guide rail 126.

Industrial Applicability

While there has been described the present invention according to the embodiment with reference to the accompanying drawings, the present invention is not limited thereto. Furthermore, the present invention may be embodied in various modifications without departing from the spirit and scope of the invention. While the embodiment concerns the apparatus configured to have an optical disk and an optical head apparatus comprising a pair of optical pickups 33 and 34, the present invention is not limited to this configuration. The present invention can be widely applied to apparatuses comprising a combination of recording media such as a magnetic optical disk, a magnetic disk, a capacitance disk, and the like, and a head apparatus to record and/or reproduce data from the recording media.

The present invention relates to a disk recording-reproducing apparatus that rotates a disk-shaped recording medium and uses a pickup to record and/or reproduce data from the recording medium. The apparatus comprises a tray to move the disk-shaped recording medium between a recording-reproducing position and an ejecting position; and a drive section that is provided on the tray to self-propel the tray between the recording-reproducing position and the ejecting position.

According to such a disk recording-reproducing apparatus, the drive section is provided on the tray to self-propel the tray between the recording-reproducing position and the ejecting position. This eliminates the need to provide a drive section at the fixed side, saving the space along the tray movement direction.

Further, the present invention relates to a disk recording-reproducing apparatus that rotates a disk-shaped recording medium and uses a pickup to record and/or reproduce data from the recording medium. The apparatus comprises a base unit having a pickup and a turntable to rotate a disk-shaped recording medium; a chucking slider to move the base unit up and down; a tray to move the disk-shaped recording medium between a recording-reproducing position and an ejecting position on the base unit; and a drive section provided on the tray to self-propel the tray between the recording-reproducing position and the ejecting position. The drive section moves the tray to the recording-reproducing position to stop movement and then moves the chucking slider to raise the base unit.

Accordingly, such a disk recording-reproducing apparatus can self-propel the tray by means of the drive section that allows the tray to self-propel between the recording-reproducing position and the ejecting position. When the tray moves to the recording-reproducing apparatus and stops, the drive section on the tray slides the chucking slider to raise the base unit. That is to say, the drive section for the tray can be also used as a drive source for moving the base unit up and down.

Moreover, the present invention relates to a disk recording-reproducing apparatus that rotates a disk-shaped recording medium and uses a pickup to record and/or reproduce data from the recording medium. The apparatus comprises a tray to move the disk-shaped recording medium between a recording-reproducing position and an ejecting position; a transport means for moving the tray between the recording-reproducing position and the ejecting position; and a detection means for detecting a type of the disk-shaped recording medium placed on the tray. A detection result of the detection means changes an output or speed of the transport means.

Such a disk recording-reproducing apparatus changes a driving force or a transport speed of the transport means in accordance with a detection result for the disk-shaped recording medium. It becomes possible to move the tray with an optimum driving force or speed in accordance with weights and applied loads for types of disk-shaped recording media.

The invention claimed is:

1. A disk recording-reproducing apparatus which rotates a disk-shaped recording medium and uses a pickup for recording and/or reproducing operations, said apparatus comprising:
    a tray configured to move said disk-shaped recording medium between a recording-reproducing position and an ejecting position; and
    a drive section which is provided on said tray to self-propel said tray between said recording-reproducing position and said ejecting position,
    wherein a motor of said drive section is supplied with power from a fixed side via a flexible printed circuit board subject to U-shaped bending, and said tray is provided with a retractable guide mechanism that is retractable relative to the tray and supports said flexible printed circuit board from underneath.

2. The disk recording-reproducing apparatus according to claim 1, wherein, in a chassis, an output end of said drive section comprises a pinion which rotates by engaging with a rack arranged along a transport direction of said tray for self-propelling.

3. The disk recording-reproducing apparatus according to claim 1, wherein said retractable guide mechanism is configured to be retractable in accordance with the tray movement.

* * * * *